United States Patent
Lee et al.

(10) Patent No.: US 11,404,021 B2
(45) Date of Patent: Aug. 2, 2022

(54) ELECTRONIC DEVICE AND METHOD OF PROCESSING NOTIFICATION IN ELECTRONIC DEVICE

(71) Applicant: Samsung Electronics Co., Ltd., Suwon-si (KR)

(72) Inventors: Ho-Young Lee, Seoul (KR); Gyu-Chual Kim, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/850,582

(22) Filed: Apr. 16, 2020

(65) Prior Publication Data

US 2020/0243037 A1 Jul. 30, 2020

Related U.S. Application Data

(63) Continuation of application No. 15/186,255, filed on Jun. 17, 2016, now abandoned.

(30) Foreign Application Priority Data

Jun. 18, 2015 (KR) ......................... 10-2015-0086862

(51) Int. Cl.
*G09G 5/00* (2006.01)
*G06F 3/01* (2006.01)
(Continued)

(52) U.S. Cl.
CPC ............... *G09G 5/00* (2013.01); *G06F 3/017* (2013.01); *G06F 3/0484* (2013.01);
(Continued)

(58) Field of Classification Search
CPC .. G09G 2340/64; G09G 5/00; G09G 2340/10; G09G 2340/12; G09G 2340/13; G09G 2340/145; G09G 2340/00
See application file for complete search history.

(56) References Cited

U.S. PATENT DOCUMENTS 5,574,846 A * 11/1996 Yoshimura ............. G06F 16/94
345/418
6,031,530 A 2/2000 Trueblood
(Continued)

FOREIGN PATENT DOCUMENTS

CN 101859230 A 10/2010
CN 102106145 A 6/2011
(Continued)

OTHER PUBLICATIONS

Office Action dated Apr. 23, 2021 in connection with Chinese Patent Application No. 201610446123.7, 28 pages.
(Continued)

*Primary Examiner* — Sarah Lhymn

(57) ABSTRACT

Various embodiments of the present disclosure relate to an electronic device and a method of processing a notification in an electronic device. The electronic device may include a display that displays at least one object on a screen, and a controller that determines a notification display area for displaying a notification on the screen based on a gesture of a user associated with at least one object displayed on the screen, and to display the notification in at least one determined notification display area.

12 Claims, 29 Drawing Sheets

(51) Int. Cl.
*G06F 3/0484* (2022.01)
*G06F 3/04883* (2022.01)

(52) U.S. Cl.
CPC . *G06F 3/04883* (2013.01); *G09G 2340/0464* (2013.01); *G09G 2340/10* (2013.01); *G09G 2340/12* (2013.01); *G09G 2340/14* (2013.01); *G09G 2340/145* (2013.01); *G09G 2354/00* (2013.01)

(56) References Cited

U.S. PATENT DOCUMENTS

| | | | |
|---|---|---|---|
| 7,155,729 | B1 | 12/2006 | Andrew et al. |
| 8,127,248 | B2 * | 2/2012 | Ording .................. G06F 3/0481 715/767 |
| 2003/0122879 | A1 | 7/2003 | Inui et al. |
| 2006/0064700 | A1 | 3/2006 | Ludvig et al. |
| 2010/0026721 | A1 | 2/2010 | Park et al. |
| 2012/0095601 | A1 | 4/2012 | Abraham et al. |
| 2013/0019182 | A1 | 1/2013 | Gil et al. |
| 2014/0035835 | A1 | 2/2014 | Zhang et al. |
| 2014/0123183 | A1 | 5/2014 | Fujimoto et al. |
| 2014/0152557 | A1 | 6/2014 | Yamamoto et al. |
| 2014/0165007 | A1 | 6/2014 | Heo et al. |
| 2014/0280657 | A1 | 9/2014 | Miller et al. |
| 2014/0282147 | A1 | 9/2014 | Kim et al. |
| 2014/0282159 | A1 | 9/2014 | Lee et al. |
| 2014/0380213 | A1 | 12/2014 | Wang |
| 2015/0004945 | A1 | 1/2015 | Steeves et al. |
| 2016/0209986 | A1 | 7/2016 | Kim |
| 2016/0284321 | A1 | 9/2016 | Cho |

FOREIGN PATENT DOCUMENTS

| | | |
|---|---|---|
| CN | 102236516 A | 11/2011 |
| CN | 103649894 A | 3/2014 |
| CN | 103793137 A | 5/2014 |
| CN | 104238869 A | 12/2014 |
| CN | 104461287 A | 3/2015 |
| JP | 2003-195994 A | 7/2003 |
| KR | 10-2014-0028108 A | 3/2014 |
| KR | 10-2014-0048934 A | 4/2014 |
| KR | 10-2014-0112918 A | 9/2014 |

OTHER PUBLICATIONS

Notification of the Reasons for Rejection dated Sep. 27, 2021, in connection with Korean Application No. 10-2015-0086862, 13 pages.
Korean Intellectual Property Office, "Notification of the Reasons for Rejection," dated Jun. 13, 2022, in connection with Korean Patent Application No. 10-2022-0031576, 9 pages.

* cited by examiner

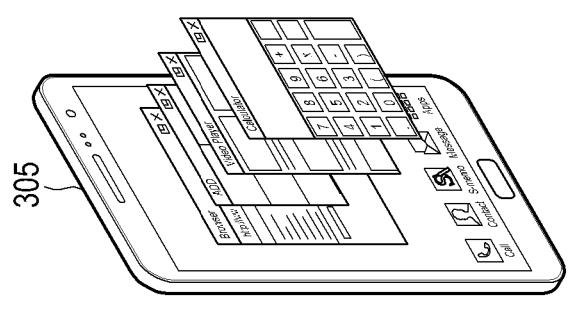
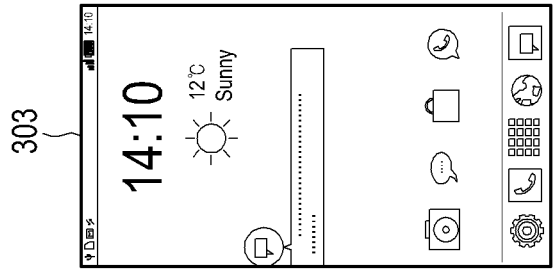
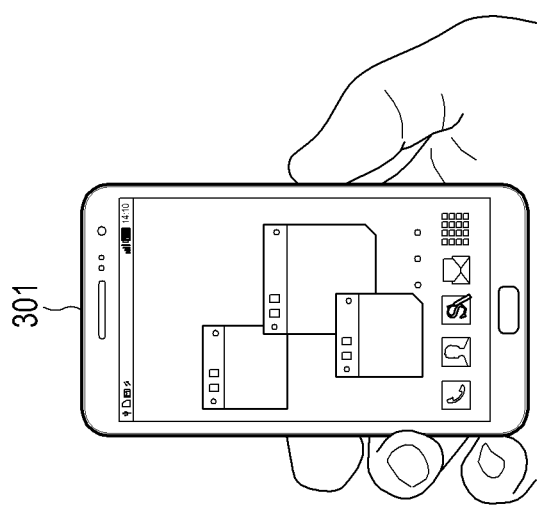
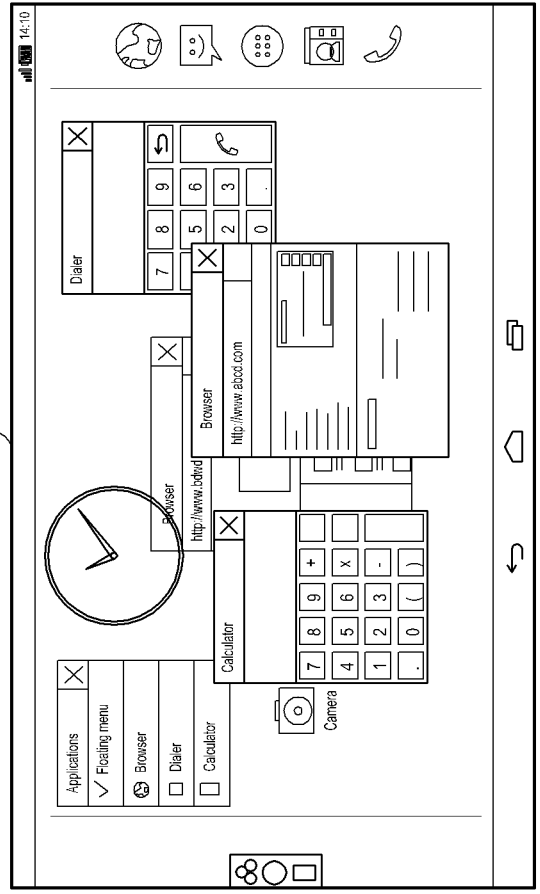
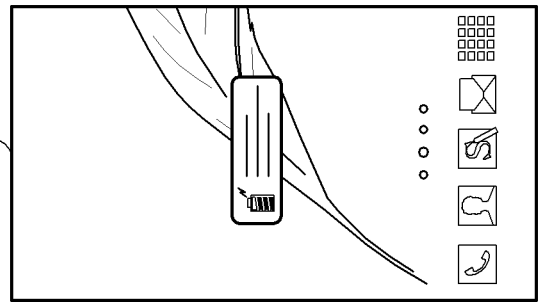
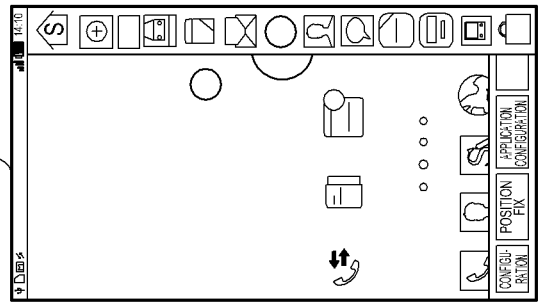
FIG.3

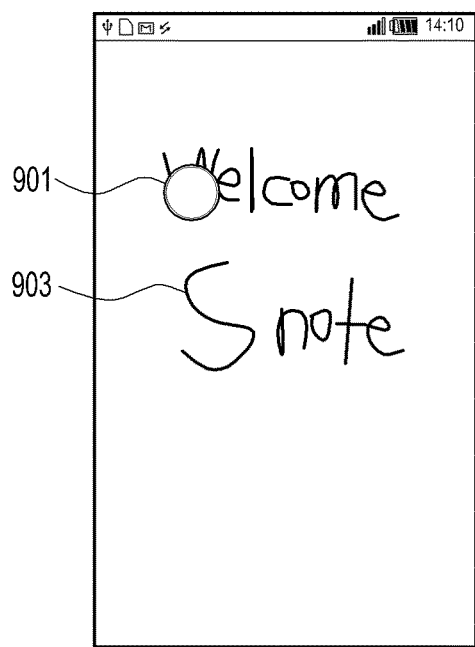
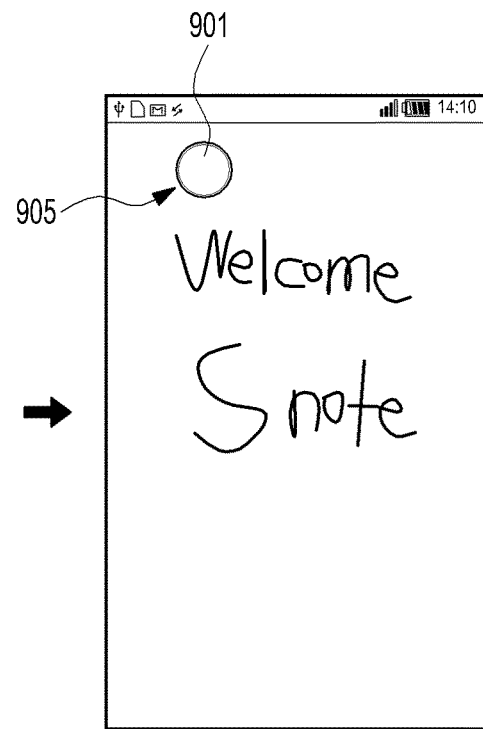
FIG.9A  FIG.9B
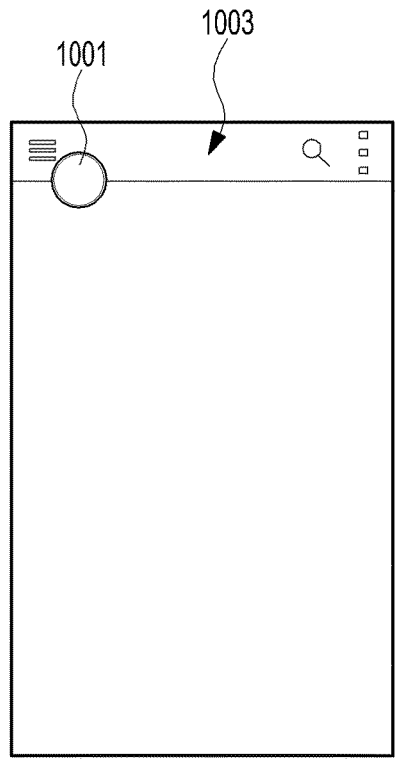
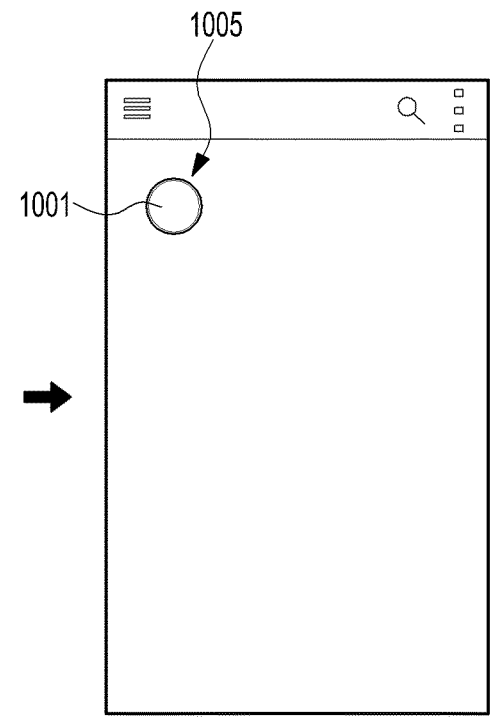
FIG.10A  FIG.10B

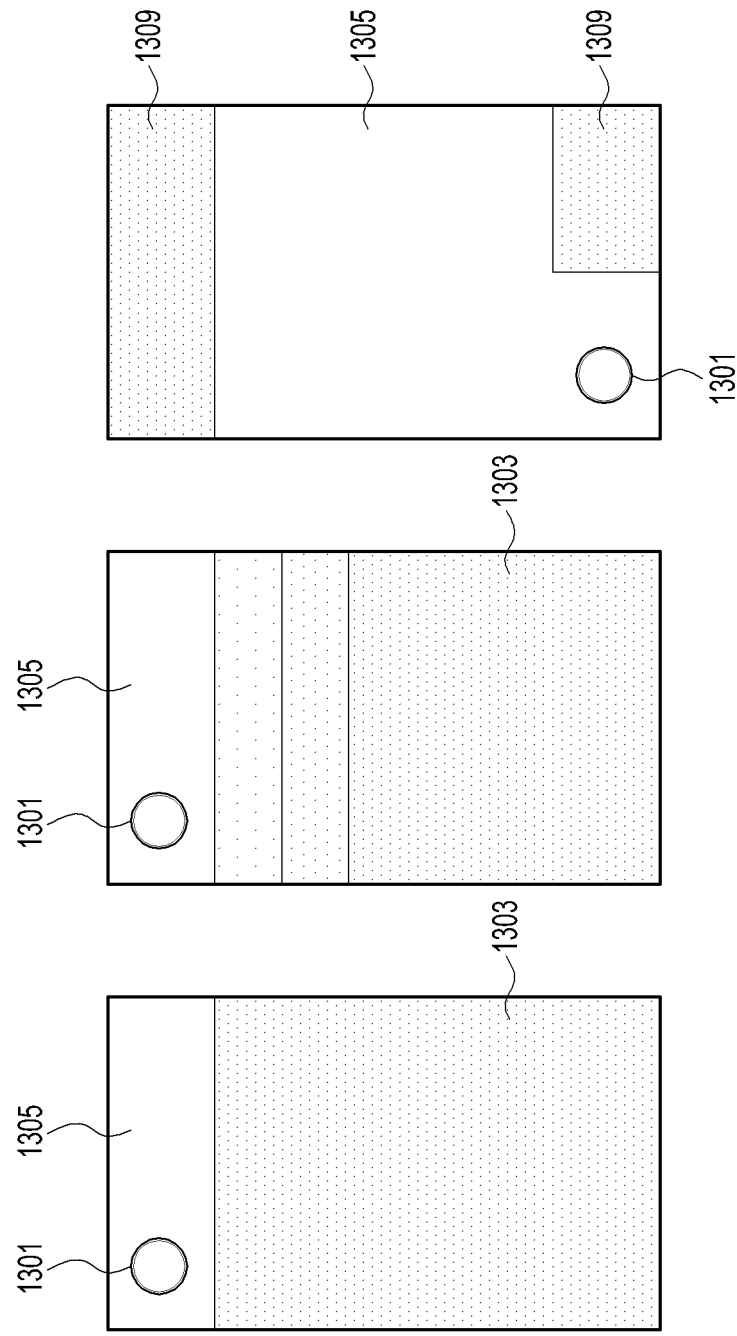

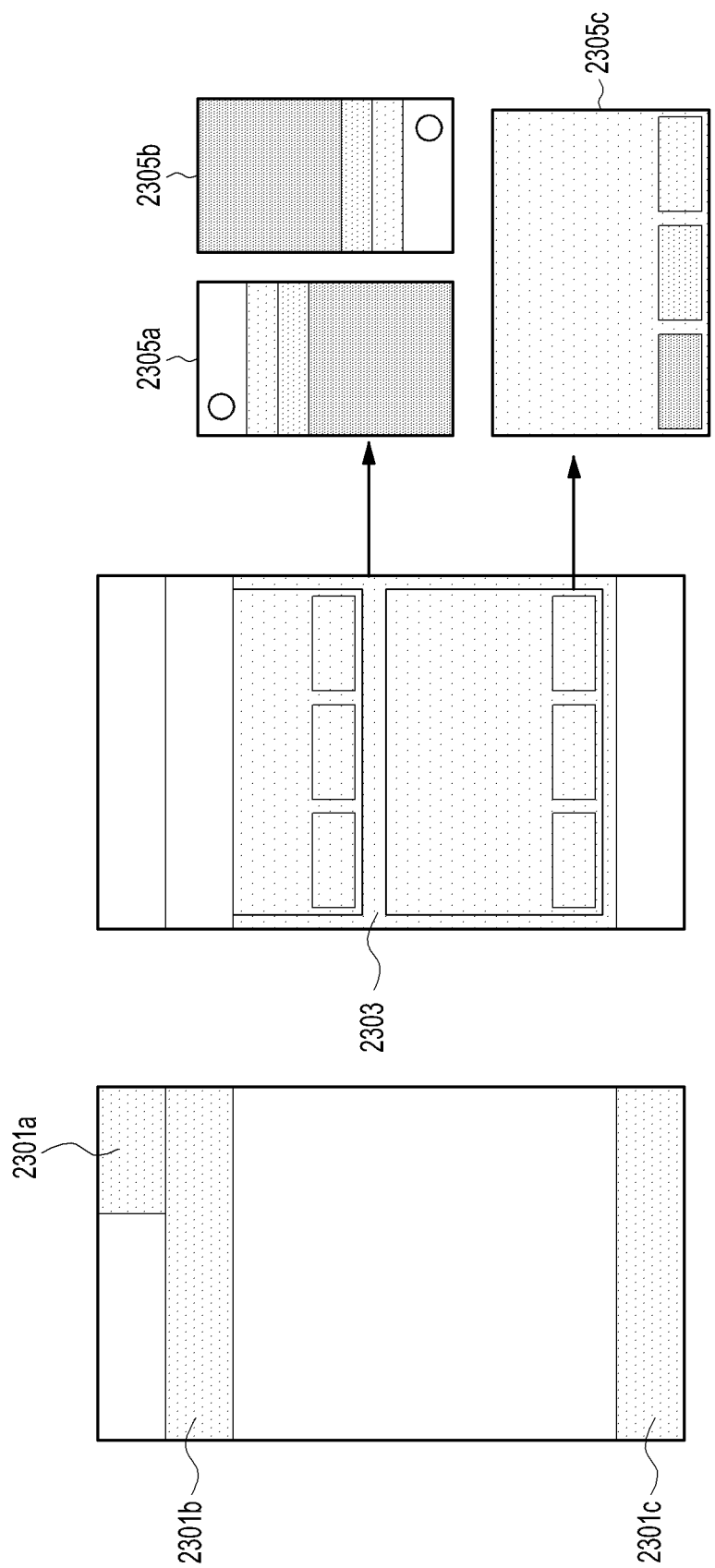

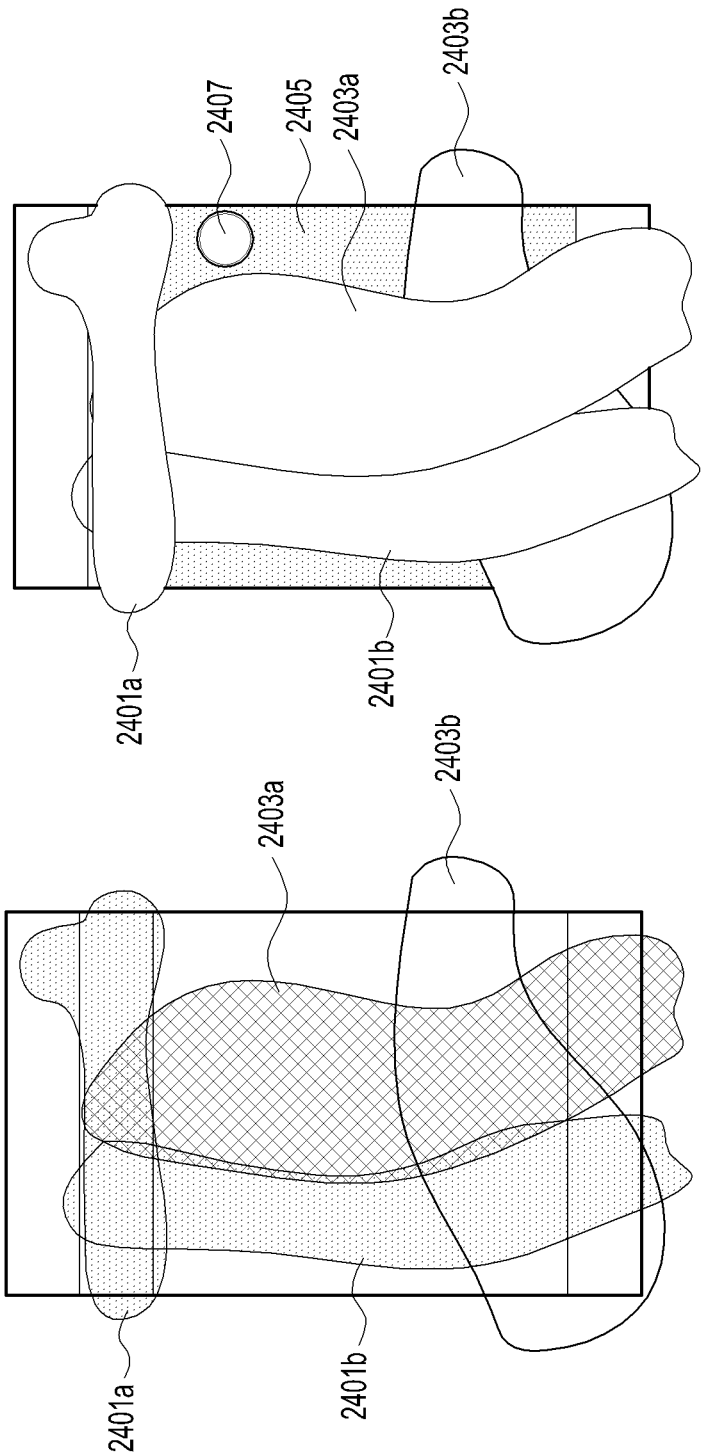

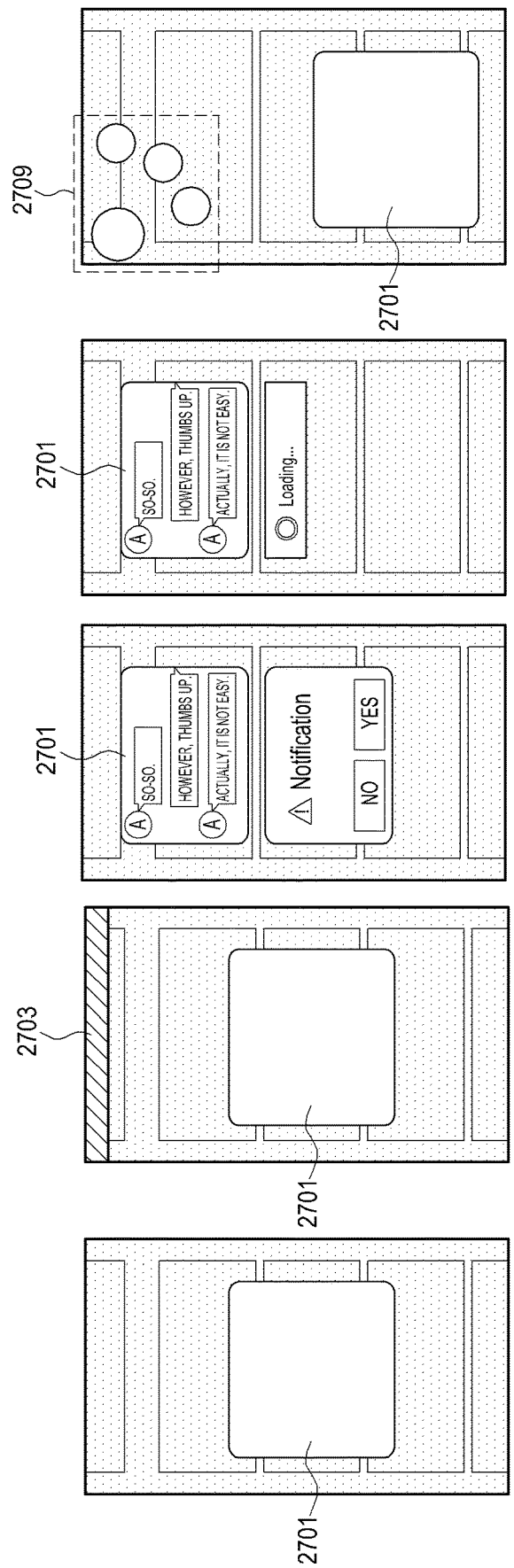

ELECTRONIC DEVICE AND METHOD OF PROCESSING NOTIFICATION IN ELECTRONIC DEVICE

CROSS-REFERENCE TO RELATED APPLICATIONS

This application is a continuation of application Ser. No. 15/186,255, filed Jun. 17, 2016, which claim priority to Korean Application No. 10-2015-0086862, which was filed in the Korean Intellectual Property Office on Jun. 18, 2015, the entire contents of which are hereby incorporated by reference.

BACKGROUND

1. Field

Various embodiments of the present disclosure relate to an electronic device and a method of processing a notification in an electronic device.

2. Description of Related Art

An electronic device may display an object on a screen of a display in various types. In general, a screen of a display in an electronic device may be formed of a plurality of layers. Basically, the screen may include a foundation that is gray or is an achromatic color of a gray affiliation. The screen may form a layer type block on the foundation. The screen may include at least one object in the formed block to display the object.

In addition, a layer that includes a newly generated object may overlap the layer on which the object is displayed and may be displayed on the layer on which the object is displayed. An advertisement and the like covering the whole, or some, of the layer displaying the object on the screen may be displayed in various types.

However, a plurality of layers overlap each other and are displayed on the screen in the electronic device. For example, an object displayed as a floating type is a notification of various overlay types, such as a widget of an overlay type, a messenger chat window, a sticker memo, and a clock. The electronic device may provide an effect in which the notification is shown at the top of the screen.

Therefore, since the object displayed at the top of the screen in the electronic device covers an object displayed on the bottom layer, there is a disadvantage in the use of the object displayed on the bottom layer.

SUMMARY

To address the above-discussed deficiencies, it is a primary object to provide, an electronic device for processing a notification based on, for example, at least one object displayed on a screen or a gesture of a user related to an object, and may further provide a method of processing a notification in an electronic device.

According to an aspect of the present disclosure, an electronic device may include a display that displays at least one object on a screen and a controller. The controller may determine a notification display area for displaying a notification on the screen based on a gesture of a user related to at least one object displayed on the screen and may also display the notification in at least one determined notification display area.

According to another aspect of the present disclosure, a method of processing a notification in an electronic device includes displaying at least one object on a screen, determining a notification display area for displaying a notification on the screen based on a gesture of a user related to at least one object displayed on the screen, and displaying the notification in at least one determined notification display area.

According to another embodiment of the present disclosure, an object displayed on a screen may be used in an electronic device by processing a notification so as not to cover an object displayed on a screen in at least one notification display area determined on the screen and based on at least one object displayed on the screen or a gesture of a user related to the object.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a notification displayed in an electronic device according to various embodiments of the present disclosure;

FIGS. 9A and 9B illustrate displays of a notification in an electronic device according to various embodiments of the present disclosure;

FIGS. 10A and 10B illustrate displays of a notification in an electronic device according to various embodiments of the present disclosure;

FIGS. 13A to 13C illustrate displays of a notification in an electronic device according to various embodiments of the present disclosure;

FIGS. 23A and 23B illustrate displays of a notification in an electronic device according to various embodiments of the present disclosure;

FIGS. 24A and 24B illustrate displays of a notification in an electronic device according to various embodiments of the present disclosure;

FIGS. 27A to 27E illustrate displays of a notification in an electronic device according to various embodiments of the present disclosure;

DETAILED DESCRIPTION

Figure 1:
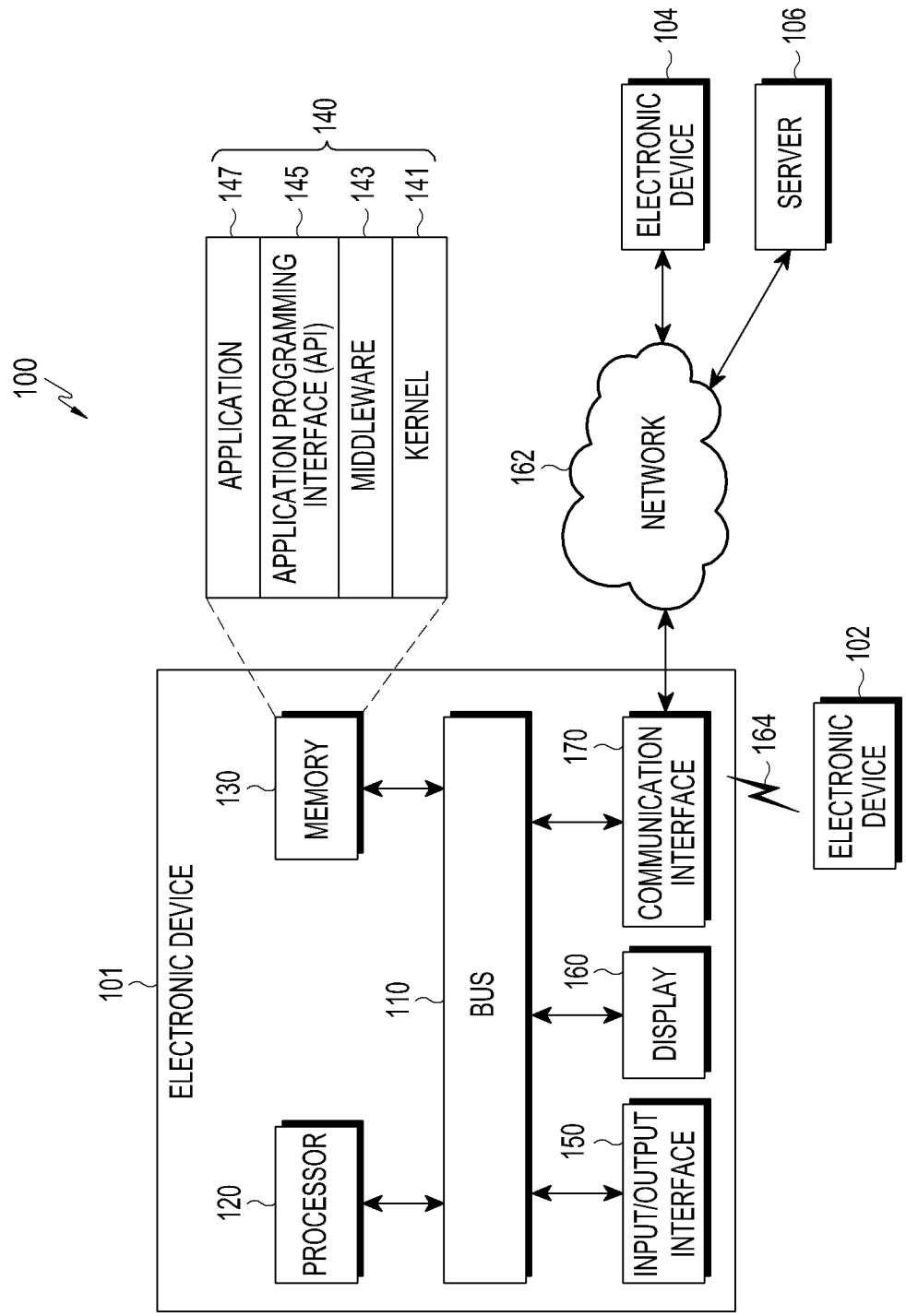
FIG. 1 illustrates a network environment according to various embodiments of the present disclosure.

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing various embodiments and are not intended to limit the scope of other embodiments. As used herein, singular forms may include plural forms as well unless the context clearly indicates otherwise. Unless defined otherwise, all terms used herein, including technical and scientific terms, include the same meaning as those commonly understood by a person skilled in the art to which the present disclosure pertains. Such terms as those defined in a generally used dictionary may be interpreted to include the meanings equal to the contextual meanings in the relevant field of art, and are not to be interpreted to have ideal or excessively formal meanings unless clearly defined in the present disclosure. Even the terms defined in the present disclosure should not be interpreted to exclude embodiments of the present disclosure as described herein.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for interconnecting the elements 110 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to the control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign, to at least one of the application programs 147, priorities for using the system resources (for example, the bus 110, the processor 120, the memory 130, or the like) of the electronic device 101. For example, the middleware 143 may perform scheduling or loading balancing on the one or more task requests by processing the one or more task requests according to the priorities assigned thereto.

For example, the API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of contents (for example, text, images, videos, icons, or symbols) for the user. The display 160 may include a touch screen, and may receive, for example, a touch, gesture, proximity, or hovering input by using an electronic pen or a part of the user's body.

The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM) and the like, for example, as a cellular communication protocol. In addition, the wireless communication may include, for example, a short range communication 164. The short range communication 164 may include, for example, at least one of Wi-Fi, Bluetooth, Near Field Communication (NFC), Global Navigation Satellite System (GNSS), and the like. The GNSS may include, for example, at least one of a Global Positioning System (GPS), a Global navigation satellite system (Glonass), a Beidou Navigation satellite system (hereinafter, referred to as "Beidou"), Galileo, and the European Global satellite-based navigation system according to the place of usage, a bandwidth, or the like. Hereinafter, the "GPS" may be used interchangeably used with the "GNSS" in the present disclosure. The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network, such as a computer network (for example, a LAN or a WAN), the Internet, and a telephone network.

Each of the first and second external electronic devices 102 and 104 may be of a type that is identical to, or different from, that of the electronic device 101. According to an embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104) or the server 106 may execute the requested functions or the additional functions, and may deliver a result of the execution to the electronic device 101. The electronic device 101 may process the received result as it is or may additionally process the result to provide the requested functions or services. To achieve this, for example, cloud computing, distributed computing, or client-server computing technology may be used.

Hereinafter, an electronic device, according to various embodiments of the present disclosure, will be described with reference to the accompanying drawings.

A notification described in various embodiments of the present disclosure may refer to an object displayed on a screen of a display in an electronic device in at least one among a floating type, an overlay (e.g., various kinds of quick accesses, a messenger multi-window, a specific icon, a specific widget and a launcher), and other various display types. The notification may be displayed on a searched notification display area during a predetermined time and may disappear. Alternatively, the notification may be displayed or moved and displayed on a searched notification display area until a user identifies the notification.

In addition, a notification display area described in various embodiments of the present disclosure may be an area searched for displaying a notification on a screen of a display. The notification display area may refer to an area searched so as not to cover at least one displayed object or an important area based on at least one object displayed on a first layer exposed on the screen or a gesture of a user.

In addition, an object described in various embodiments of the present disclosure may refer to various types of data output from an electronic device or an operation (e.g., procedure, method or function) related to the data. For example, the object may refer to various types of contents displayed on a screen according to a specific function execution of an electronic device.

Figure 2:
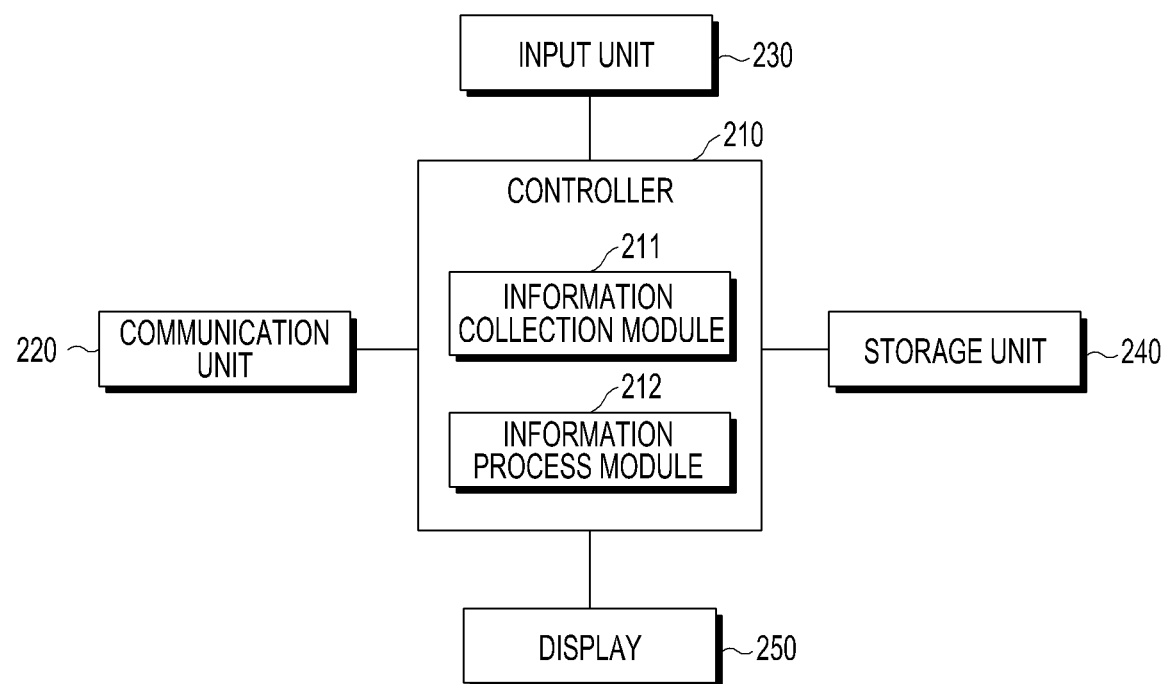
FIG. 2 illustrates a configuration of an electronic device according to various embodiments of the present disclosure.
Figure 4A:
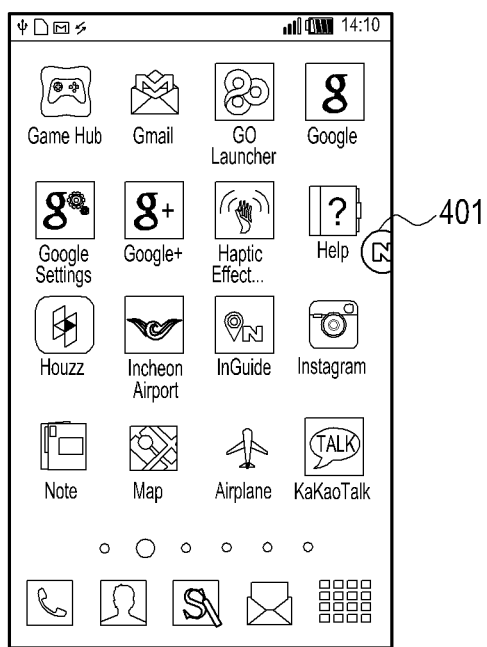
FIGS. 4A and 4B illustrate displays of a notification in an electronic device according to various embodiments of the present disclosure.
Figure 4B:
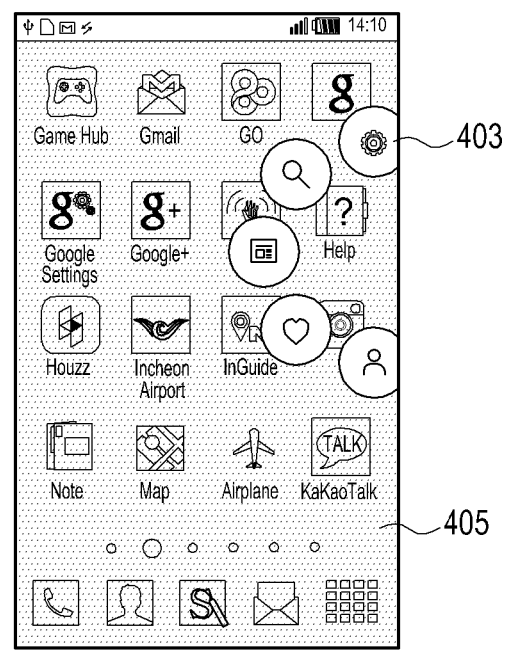

FIG. 2 is a view illustrating an example of a configuration of an electronic device according to various embodiments of the present disclosure.

Referring to FIG. 2, according to various embodiments of the present disclosure, an electronic device (e.g., the electronic device 101 of FIG. 1) may include at least one of a controller 210, a communication unit 220, an input unit 230, a storage unit 240, and a display 250.

According to various embodiments of the present disclosure, the controller 210 (e.g., the processor 120 of FIG. 1) may process information according to an operation of the electronic device, a program, or information according to an execution of a function. The controller 210 may control to display the processed information on the display 250, or may control to output the processed information through an audio module (not shown).

According to various embodiments of the present disclosure, the controller 210 may include an information collection module 211 or an information process module 212. The information collection module 211 may collect information on a gesture of a user and information on at least one object displayed on a screen. The information process module 212 may process the collected information or may perform an operation for processing a notification.

According to various embodiments of the present disclosure, the controller 210 may control to determine a notification display area for displaying a notification on the screen based on a gesture of a user related to at least one object displayed on the screen of the display 250, and to display the notification in at least one determined notification display area. The controller 210 may determine the notification display area based on information on the gesture of the user and information on at least one object displayed on the screen. According to various embodiments of the present disclosure, as shown in FIG. 3, the notification may include an object (e.g., at least one among objects 301, 303, 305, 307, 309 and 311) displayed in an overlay type on the screen of the display 250 in the electronic device. In addition, the notification may be an object displayed on the screen as a floating type or at least one of other various display types. For example, the overlay may be one of various kinds of quick accesses, a messenger multi-window, a specific icon, a specific widget, and a launcher.

The controller 210, according to various embodiments of the present disclosure, may control to display a layer (e.g., a first layer) for displaying an object including at least one object on a foundation layer on a screen including a plurality of layers. According to various embodiments, the controller 210 may control to display a notification 401 in an area on the first layer as shown in accompanying FIG. 4A. In addition, according to various embodiments, the controller 210 may control to display a layer (e.g., a second layer) including a notification on the first layer by overlaying the layer including the notification on the first layer. For example, as shown in accompanying FIG. 4B, the controller 210 may display a plurality of notifications 403 on an area of the screen, and may control to display a second layer 405, which includes the notification 403 by overlaying the second layer 405 on the first layer. According to various embodiments, the controller 210 may control to display, on the screen of the display, a first layer which is formed again by synthesizing a notification generated on the first layer including at least one object. The controller 210 may control to display a function corresponding to an execution request of the generated notification on another layer overlaid on the first layer.

In addition, according to various embodiments, the controller 210 may control to display or move and display the generated notification on another area (e.g., at least one area among an expanded area, a key pad, an important button and a fixed area (e.g., an indicator which is an icon displaying a current environment)) of the screen, rather than the area (e.g., a first layer display area) displaying at least one object on the screen. When a user uses at least one object displayed on the first layer and the notification display area is not discovered on the first layer, the controller 210 may control to display or move and display the generated notification to and on another area of the screen rather than an area displaying the first layer. In addition, when the controller 210 uses another area of the screen where the notification is positioned, the controller 210 may identify the use of another area of the screen based on a chase of a user's eye, a gesture (e.g., a movement of a hand), or information on a user's voice (e.g., a voice instruction for processing a notification). In one embodiment, the controller 210 may control to search for the notification display area on the screen, and may move the notification to the searched area to display the notification on the searched area.

In addition, according to various embodiments of the present disclosure, when the notification is generated, the controller 210 may control to move and display the generated notification to and on the searched notification display area after displaying the generated notification on an initially configured position. In addition, the controller 210 may control to display the generated notification on the searched notification display area by just searching for the notification display area of the notification generation. According to various embodiments, when the object displayed on the screen is changed, for example, when other objects are displayed on the screen according to an execution of another function, since the object positioned in the area displaying the notification may not be shown, the controller 210 may control to move and display the notification to and on a notification display area which is newly searched in a previous notification display area by searching for the notification display area again.

In addition, according to various embodiments of the present disclosure, the controller 210 may control to move and display the notification displayed on the display 250 on the screen based on the gesture of the user related to at least one object. The controller 210 may control to collect sensing information according to the gesture of the user on the screen through various sensors included in the electronic device, and may control to store the collected sensing information as information on the user gesture. The information on the user gesture may include, for example, at least one of information on a movement (e.g., at least one of a hand movement, and a chase of an eye) of a user's body, user's voice information and user input information using an input means (e.g., a pen). In addition, the information on the user gesture may include various pieces of gesture information. In addition, the information on the user gesture may be collected at the time point when the notification is generated, or may be collected when an event for the user's gesture is generated on the screen. The information on the user gesture may be stored as use history information.

According to various embodiments of the present disclosure, when the event for the gesture of the user is generated on the screen, the controller 210 may control to identify the area where the gesture of the user is generated. For example, the controller 210 may control to display or move and display the notification displayed on the screen to and on a notification display area which is searched in a direction opposite to the identified area. In addition, according to various embodiments, the controller 210 may search for at least one area where the gesture of the user is previously generated based on the use history information, which is previously collected according to the gesture of the user on the screen and stored as the information on the gesture of the user, and may search for an area except for at least one searched area as the notification display area. In addition, the controller 210 may control to display or move and display the generated notification to and on the searched notification display area.

In addition, according to various embodiments of the present disclosure, the controller 210 may search for the notification display area on the screen displaying the first layer according to a result of an analysis of the first layer including at least one object.

According to various embodiments of the present disclosure, when the object is displayed on some of the first layer, the controller 210 may divide and search for at least one area of an area where the object is not displayed, an area where the user gesture is not generated, and a predetermined area as the notification area. According to various embodiments, the controller 210 may search for at least one area where a user's action is not generated among areas where the object is not displayed on the first layer as the notification display area.

In addition, according to various embodiments of the present disclosure, the controller 210 may identify the use frequency of the areas where the gesture of the user is generated based on the use history information according to the gesture of the user on the screen. The controller 210 may search for an area of which the identified use frequency is equal to, or lower than, a predetermined value as the notification display area. According to various embodiments, the controller 210 may search for the notification display area in a low sequence of at least one of the use frequency and importance based on the user history information. When the searched notification display area is an area where a current user gesture is generated, the controller 210 may control to display the generated notification on another searched notification display area of which at least one of the use frequency and the importance is low. The controller 210 may control to move and display the currently displayed notification to and on another searched notification display area according to the user gesture generation after displaying the notification on the searched notification display area.

In addition, according to various embodiments of the present disclosure, when the object is displayed on the whole area of the first layer, the controller 210 may identify the importance of the object in the areas displaying the object based on object attribute information, may configure the priority of the areas according to the identified importance, and may search for the notification display area according to a sequence of an area of which the configured priority is low.

In addition, according to various embodiments of the present disclosure, when the first layer including at least one object of the screen is changed and displayed, the controller 210 may control to change at least one of the size, the type, and the transparency of the notification generated on an area of the first layer according to a change of the first layer to display the notification. According to various embodiments of the present disclosure, when the notification displayed on the notification display area is selected, the controller 210 may control to display a layer (e.g., a second layer or a third layer) for executing a function corresponding to the notification on the first layer including the object.

According to various embodiments of the present disclosure, the controller 210 may control to change at least one of the size, the type and the transparency of an area displaying the second layer including the notification based on information on at least one object included in the first layer in order to display the notification.

According to various embodiments of the present disclosure, when an additional notification is generated, the controller 210 may control to display or move and display the additional notification to and on another notification display area which does not cover a previous notification on the screen. When the additional notification is generated, the controller 210 may control to search for another notification display area except for an area displaying the previous notification and to display or move and display the additionally generated notification to and on the another searched notification display area, such that another notification display area does not overlap the area display the previous notification. According to various embodiments, when two or more notifications are displayed on the screen, the controller 210 may control to determine a priority of the notifications and to control the notification such that the notification of which the priority is low or the notification identified by the user disappears on the screen. For example, when the controller 210 determines the priority in a sequence of a notification generation time, the controller 210 may control to determine that a recently generated notification is a high priority, and may control a notification generated a long time ago to disappear on the screen. The controller 210 may provide information capable of identifying the notification that disappeared on the screen through the notification displayed on the screen. In addition, according to various embodiments, when two or more notifications are generated, the controller 210 may generate a new notification including the generated notifications, and may display the newly generated notification on the searched notification display area. The newly generated notification may provide information on the number of the generated notifications such that the user may identify the number of the generated notifications.

According to various embodiments of the present disclosure, the controller 210 of the electronic device may be at least a part of a processor, and may include, for example, a combination of one or more of hardware, software, and firmware. According to various embodiments, the controller 210 may omit at least some of the above elements or may further include an element for performing an image process operation in addition to the above elements.

According to various embodiments of the present disclosure, at least some elements of the controller 210 of the electronic device may include, in hardware, at least some of at least one processor including a Central Processing Unit (CPU)/Micro Processing Unit (MPU), a memory (for example, a register and/or a Random Access Memory (RAM) to which at least one piece of memory loading data is loaded, and a bus for inputting/outputting at least one piece of data to the processor and the memory. Further, the controller 210 may include, in software, a predetermined program routine or program data, which is loaded to the memory from a predetermined recording medium, to perform a function defined in the electronic device and operation-processed by the processor.

According to various embodiments of the present disclosure, the communication unit 220 (e.g., the communication interface 170 of FIG. 1) may communicate with another electronic device or an external device according to the control of the controller 210. According to various embodiments, the communication unit 220 may transmit and receive, to and from the external device, data related to an operation executed according to the control of the controller 210. The communication unit 220 may be connected to a network through a wireless or wired communication through the communication interface. Alternatively, the communication unit 220 may communicate through a connection between devices. The wireless communication may include at least one of, for example, Wi-Fi, Bluetooth (BT), Near Field Communication (NFC), Global Positioning System (GPS) and cellular communication (for example, LTE, LTE-A, CDMA, WCDMA, UMTS, WiBro, GSM or the like). The wired communication may include at least one of, for example, a Universal Serial Bus (USB), a High Definition Multimedia Interface (HDMI), Recommended Standard 232 (RS-232), and a Plain Old Telephone Service (POTS). The communication unit 220 may include all types of communication schemes, which have been or are at this time widely known or are foreseeable, obvious, or will be developed in the future as well as the aforementioned communication schemes.

According to various embodiments of the present disclosure, the input unit 230 of the electronic device (for example, the input/output interface 150 of FIG. 1) may transfer, to the controller 210, various pieces of information such as number and character information input from the user, various function settings, and signals which are input in connection with a control of functions of the electronic device. Further, the input unit 230 may support a user input for executing an application that supports a particular function. The input unit 230 may include at least one of a key input means, such as a keyboard and a keypad, a touch input means, such as a touch sensor and a touch pad, a sound source input means, a camera, and various sensors. The input unit 230 may include a gesture input means. In addition, the input unit 230 may include all types of input means which are being developed currently or will be developed in the future. In addition, according to various embodiments of the present disclosure, the input unit 230 may receive, from a user, information input by the user, through the touch panel of the display 250 or the camera, and may transfer the input information to the controller 210.

According to various embodiments of the present disclosure, the input unit 230 may transfer information on the gesture of the user received through the camera or various sensors to the controller 210. In addition, the input unit 230 may transfer a selection input signal for the object displayed on the screen or the notification to the controller 210.

According to various embodiments of the present disclosure, the storage unit 240 of the electronic device (e.g., the memory 130 of FIG. 1) may temporarily store a program used in a function operation according to various embodiments and various pieces of data generated in a program execution. The storage unit 240 may largely include a program area and a data area. The program area may store pieces of information related to the driving of the electronic device, such as an Operating System (OS) that boots the electronic device. The data area may store transmitted/received data or generated data according to various embodiments. Further, the storage unit 240 may include at least one storage medium of a flash memory, a hard disk, a multimedia card micro type memory (for example, an SD or XD memory), a RAM, and a ROM.

According to various embodiments of the present disclosure, the storage unit 240 may include a database storing information on an analysis result of the objects displayed on the first layer of the screen and a data base storing information on the gesture of the user.

According to various embodiments of the present disclosure, the display 250 (e.g., some component of the input/output interface 150 or the display 160 of FIG. 1) of the electronic device may output operation execution result information (e.g., at least one of a text, an image and a video) according to the control of the controller 210.

The display 250 may display an input pad (e.g., button) capable of inputting at least one of various characters, a number, and a symbol to an input window on the screen in various methods. Further, the display 250 may display a service execution screen according to an execution of various applications related to information transmission/reception. In addition, the display 250 may display the plurality of layers on the screen according to the control of the controller 210, and may display the first layer including at least one object on the foundation. In addition, the display 250 may display the notification on the first layer under the control of the controller 210, and may display the notification that is moved based on the gesture of the user.

In addition, according to various embodiments of the present disclosure, when the display 250 of the electronic device is implemented in the touch screen form, the display 250 may correspond to a touch screen of an input unit (not shown). When the display 250 is implemented in the touch screen form together with the input unit 230, the display 250 may display various pieces of information generated according to a user's touch action.

In addition, according to various embodiments of the present disclosure, when the display 250 of the electronic device divides and uses the screen, if the user uses the object displayed on a divided first screen, that is, if the gesture of the user is generated in the divided first screen, the display 250 may display the notification on a divided second screen under the control of the controller 210. In addition, according to various embodiments, the display 250 of the electronic device may be configured by one or more of a Liquid Crystal Display (LCD), a Thin Film transistor LCD (TFT-LCD), an Organic Light Emitting Diode (OLED), LED, Active Matrix OLED (AMOLED), a flexible display, and a 3 dimensional display. In addition, some of the displays may be implemented in a transparent type or a light transmission type so that the outside can be seen therethrough. The display may be implemented in a transparent display form including Transparent OLED (TOLED).

In addition, according to various embodiments of the present disclosure, the electronic device may further include another display (e.g., an expanded display or a flexible display) installed in the electronic device, in addition to the display 250. The electronic device may further include a display of another external electronic device (e.g., at least one of an external display device, a wearable device and an external terminal device) linked with the electronic device.

According to various embodiments of the present disclosure, the electronic device may further include an audio module (not shown) (e.g., the input/output interface 150 of FIG. 1). The audio module may output a sound. For example, the audio module may include at least one of an audio codec, a microphone (MIC), a receiver, an earphone output (i.e., EARL) and a speaker. In addition, according to various embodiments of the present disclosure, the electronic device may further include a means for outputting a vibration or a means for outputting a smell.

As described above, the elements of the electronic device according to various embodiments are described in relation to the electronic device of FIG. 2. However, not all elements illustrated in FIG. 2 are necessary components. The electronic device may be implemented by a larger number of elements than the illustrated elements or a smaller number of elements than the illustrated elements. In addition, the positions of the elements of the electronic device described through FIG. 2 are changeable according to various embodiments.

An electronic device according to one among various embodiments of the present disclosure may comprise: a display that displays at least one object on a screen; and a controller that controls to determine a notification display area for displaying a notification on the screen based on a gesture of a user related to at least one object displayed on the screen, and to display the notification in at least one determined notification display area.

According to various embodiments of the present disclosure, the controller may control to move and display the notification, which is displayed on the display, on the screen, based on the gesture of the user related to at least one object.

According to various embodiments of the present disclosure, the notification display area may be determined based on information on the gesture of the user and information on at least one object displayed on the screen.

According to various embodiments of the present disclosure, the controller may control to display at least one object in first layer of the screen including a plurality of layers, and controls to display the notification on some of the screen in a second layer located on the first layer.

According to various embodiments of the present disclosure, when an event for the gesture of the user is generated on the screen, the controller may identify an area where the gesture of the user is generated, and may search for the notification display area in an area except for the identified area.

According to various embodiments of the present disclosure, the controller may search for the notification display area based on use history information according to the gesture of the user, which is previously generated on the screen.

According to various embodiments of the present disclosure, when at least one object is displayed on the whole area of the screen, the controller may control to transparently display the notification on a first layer on which at least one object is displayed.

According to various embodiments of the present disclosure, when at least one object is displayed on some area of a first layer, the controller may search for at least one area among an where at least one object is not displayed, an area where the gesture of the user is not generated, and a determined area as the notification display area.

According to various embodiments of the present disclosure, the controller may search for the notification display area based on a priority of an area where the gesture of the user is not generated in an area where at least one object is not displayed.

According to various embodiments of the present disclosure, when there is not the area where at least one object is not displayed, the controller may identify a use frequency of at least one area where the gesture of the user is generated based on use history information according to the gesture of the user previously generated on the screen, and may search for an area where the use frequency is equal to, or smaller than, a predetermined value as the notification display area.

According to various embodiments of the present disclosure, the controller may search for the notification display area in a low use frequency sequence, and when the gesture of the user is generated in the searched notification display area, the controller may search for another notification display area of which the use frequency is next lowest, except for the area where the gesture of the user is generated.

According to various embodiments of the present disclosure, the controller may identify the importance of at least one object based on attribute information on at least one object, may configure a priority of at least one object according to information on the identified importance, and may search for an area where an object of which the configured priority is low is displayed as the notification display area.

According to various embodiments of the present disclosure, when the notification displayed on the notification display area is selected, the controller may control to execute a function corresponding to the notification.

According to various embodiments of the present disclosure, the controller may control to change at least one of the size, the type, and the transparency of the notification based on information on at least one object, and to display the notification.

According to various embodiments of the present disclosure, when an additional notification is generated on the screen, the controller controls to move the additional notification to another notification display area where the additional notification does not cover the notification, and to display the additional notification.

A method for an image processing in an electronic device as described above is described specifically with reference to accompanying figures.

Figure 5:
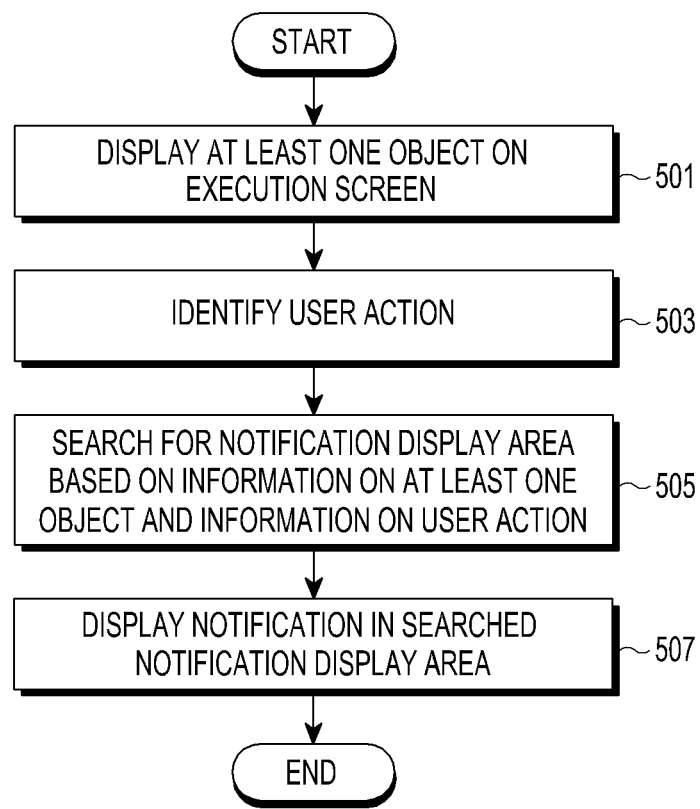
FIG. 5 is a block diagram illustrating a procedure for processing a notification in an electronic device according to various embodiments of the present disclosure.

FIG. 5 is a view illustrating an operation procedure for processing a notification in an electronic device according to various embodiments of the present disclosure.

Referring to FIG. 5, in operation 501, an electronic device (e.g., the electronic device 101 of FIG. 1) according to various embodiments of the present disclosure may display at least one object on a screen. At least one object may be included in a first layer, and may be displayed in an overlay type on the screen.

In operation 503, the electronic device may identify a gesture of a user related to at least one object on the screen.

In operation 505, the electronic device may determine a notification display area for displaying a notification based on the gesture of the user related to at least one object. According to various embodiments, the electronic device may analyze the first layer, and may search for the notification display area based on at least one of information on at least one object included in the first layer and information on the gesture of the user. In addition, according to various embodiments, the electronic device may identify an area where the object is not displayed based on the information on at least one object, and may search for the area according to the gesture of the user among the identified areas, and may determine that the searched area is the notification display area. In addition, according to various embodiments, the electronic device may determine a priority of the searched notification display area according to history information of the user.

In operation 507, the electronic device may display the notification in the determined notification display area.

Figures 6A, 6B:
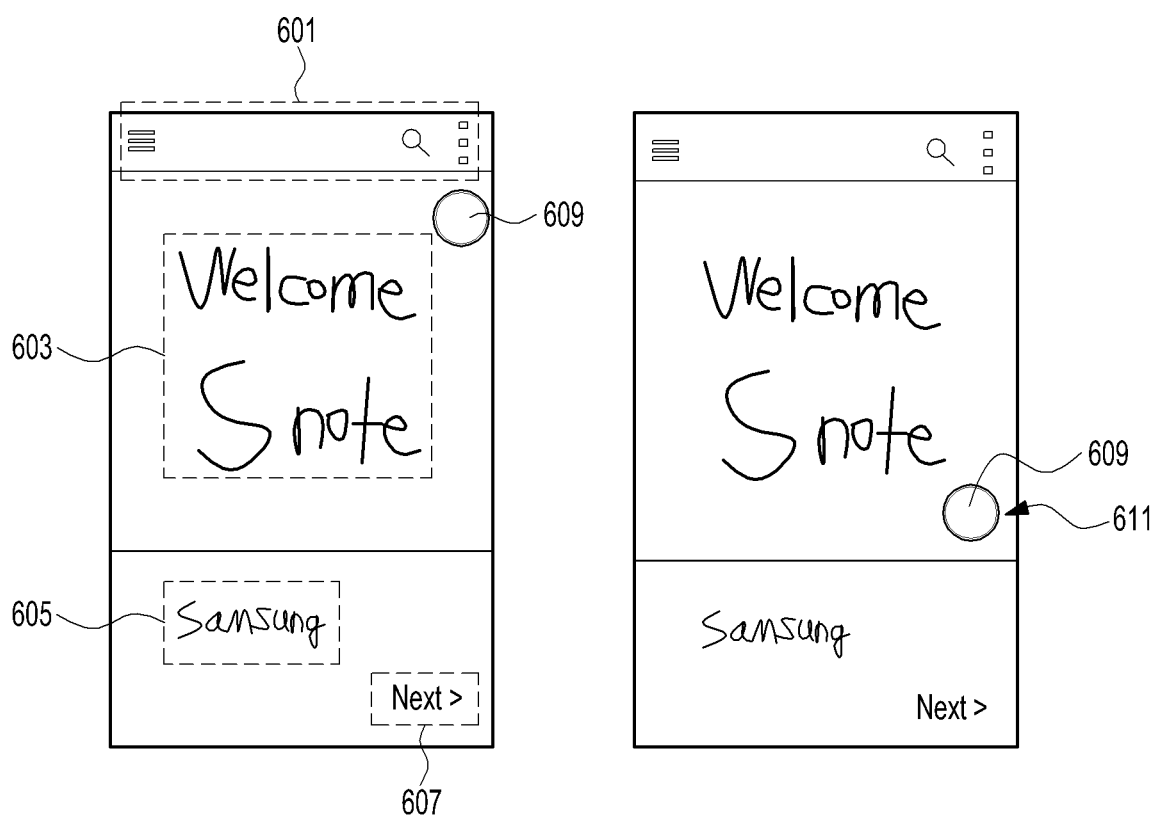
FIGS. 6A and 6B illustrate displays of a notification in an electronic device according to various embodiments of the present disclosure.

Referring to accompanying FIGS. 6A and 6B, the electronic device may display an area (e.g., indicator) 601 fixed on the screen or an object display layer (e.g., the first layer) including at least one object 603, 605, or 607, and may display a notification 609 that includes various sizes and types on the first layer. In addition, the electronic device may move and display a currently displayed notification 609 to and on a notification display area 611 searched on the object display layer based on the information on the object and the information on the user gesture. The object display layer may include one or more layers, and various types of objects may be displayed on one or more layers.

Figures 7A, 7B:
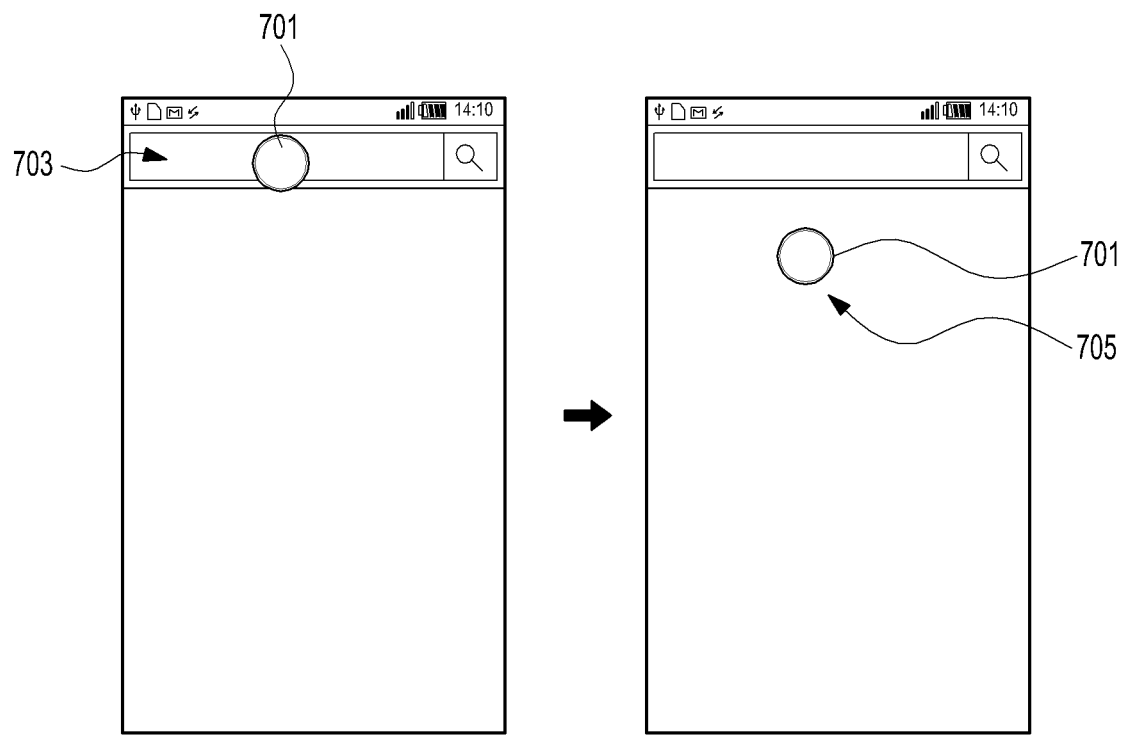
FIGS. 7A and 7B illustrate displays of a notification in an electronic device according to various embodiments of the present disclosure.
Figures 8A, 8B:
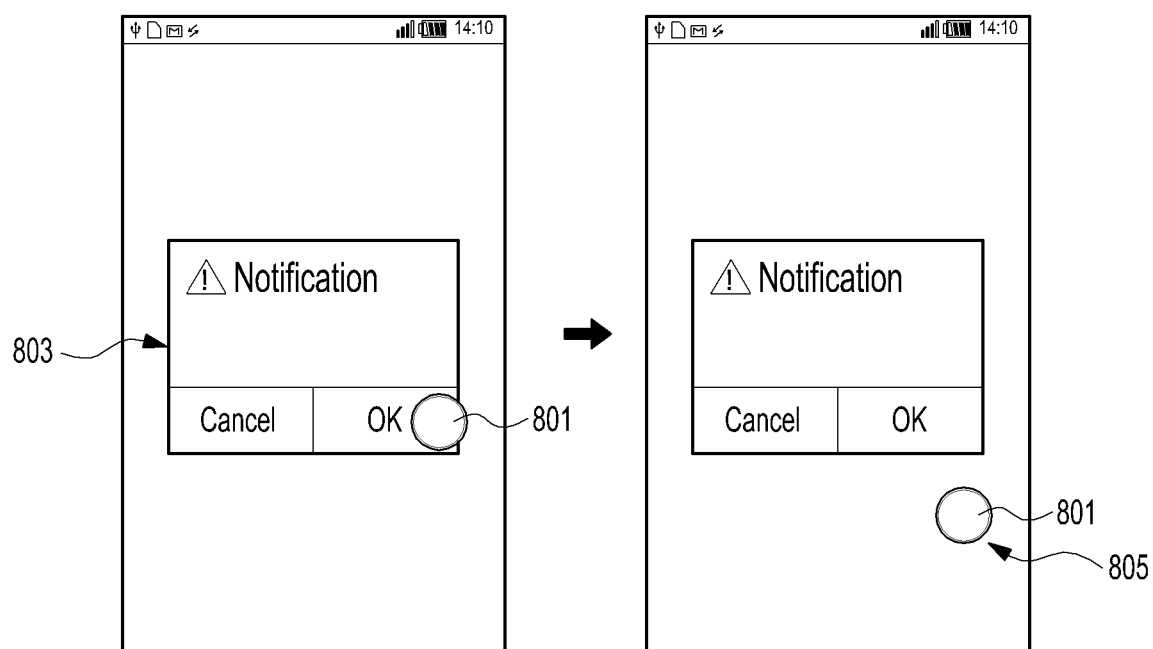
FIGS. 8A and 8B illustrate displays of a notification in an electronic device according to various embodiments of the present disclosure.
Figures 11A, 11B:
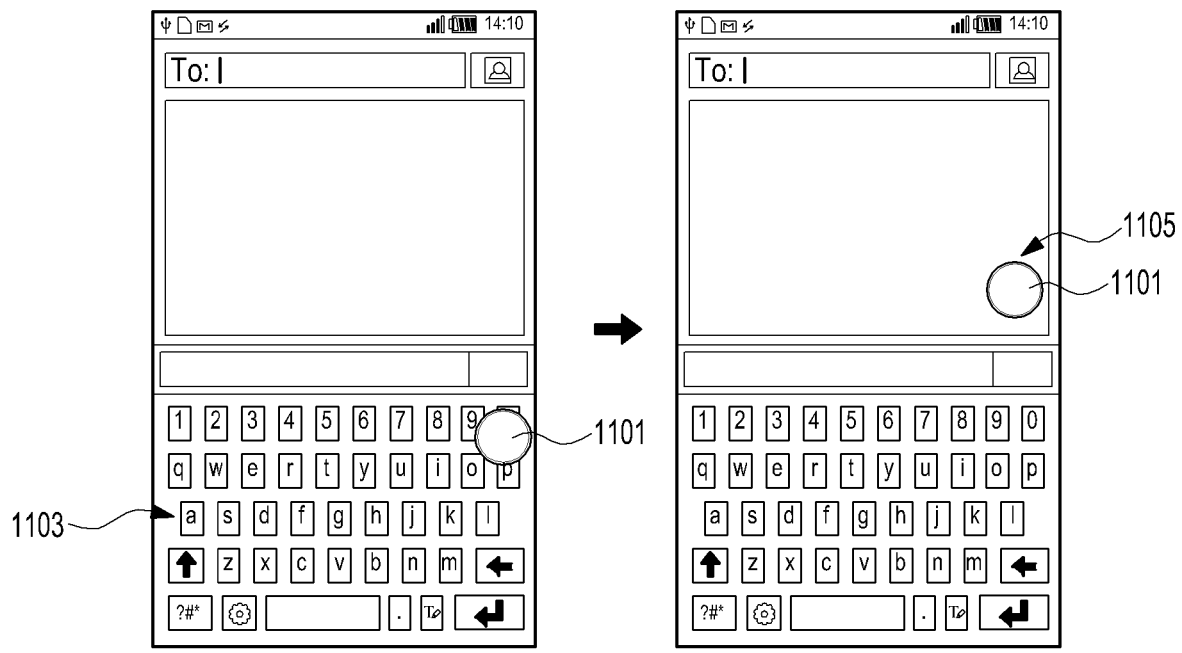
FIGS. 11A and 11B illustrate displays of a notification in an electronic device according to various embodiments of the present disclosure.

According to various embodiments, as shown in accompanying FIGS. 7A and 7B, when a notification 701 is generated on a search window 703 of the screen, the electronic device may move and display the notification 701 to and on a searched notification area 705. In addition, according to various embodiments, as shown in accompanying FIGS. 8A and 8B, when a notification 801 is generated on a pop-up window 803 displayed on the screen, the electronic device may move and display the notification 801 to and on a searched notification area 805, which does not overlap the pop-up window 803. In addition, according to various embodiments, as shown in accompanying FIGS. 9A and 9B, when a notification 901 is generated on an object 903 displayed on the screen, the electronic device may move and display the notification 901 to and on a searched notification area 905, which does not overlap the object 903.

In addition, according to various embodiments, as shown in accompanying FIGS. 10A and 10B, when a notification 1001 is generated on an important button or a fixed area (e.g., an indicator) 1003 displayed on the screen, the electronic device may move and display the notification 1001 to and on a searched notification display area 1005, which does not overlap the important button or the fixed area 1003. In addition, according to various embodiments, as shown in accompanying FIGS. 11A and 11B, when a notification 1101 is generated on a keypad 1103 displayed on the screen, the electronic device may move and display the notification 1101 to and on a searched notification display area 1105, which does not overlap the keypad 1103.

Figure 12:
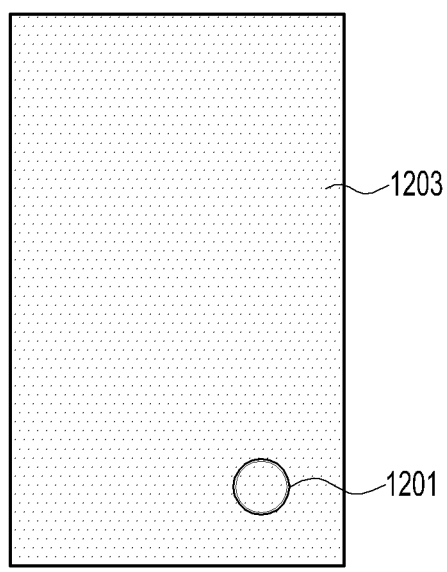
FIG. 12 illustrates a display of a notification in an electronic device according to various embodiments of the present disclosure.

According to various embodiments, as shown in accompanying FIG. 12, the electronic device may display an object display layer (e.g., the first layer) 1203 including at least one object on the screen, for example, a foundation. When the first layer 1203 is displayed on the whole area or the whole area where the object display is possible except for a fixed area, and a notification is generated, the electronic device may display the notification 1201 on some area of the first layer 1203. The notification 1201 may be positioned on the first layer 1203, and may be displayed transparently on some area of the screen.

According to various embodiments, as shown in accompanying FIG. 13A, the electronic device may display the first layer on some area of the screen, or may transparently display some area of the first layer 1303 displayed on the whole area of the screen. The electronic device may determine the some area or the transparently displayed area as a notification display area 1305, and may display a notification 1301 on the determined notification display area 1305. In addition, according to various embodiments, as shown in accompanying FIG. 13B, when the gesture of the user is generated, the electronic device may determine an area (e.g., use area) 1307 currently concentrated by the user on the first layer 1303 based on the information (e.g., currently generated gesture information) on the gesture of the user. The electronic device may search for the notification display area 1305 in an area except for the determined use area 1307, and may display the notification 1301 in the searched notification display area 1305. In addition, according to various embodiments, as shown in accompanying FIG. 13C, the electronic device may identify information (e.g., use history information) on the gesture of the user, which is previously generated and stored, may determine an area 1309 where the gesture is generated, may search for the notification display area 1305 in an area except for the determined area 1309, and may display the notification 1301 in the searched notification display area 1305.

Figures 14A, 14B:
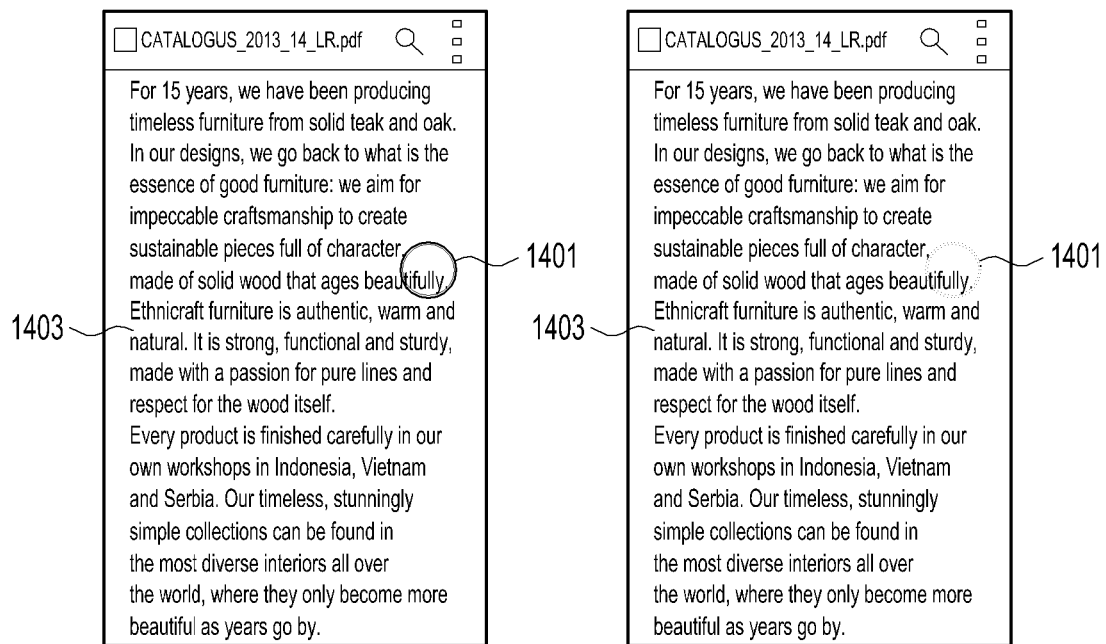
FIGS. 14A and 14B illustrate displays of a notification in an electronic device according to various embodiments of the present disclosure.

Referring to accompanying FIGS. 14A and 14B, according to various embodiments, when a first layer 1403 is overlaid and displayed on the whole area of the screen, and the notification is generated, as shown in FIG. 14A, the electronic device may display the generated notification 1401 in an area on the first layer 1403. In addition, as shown in FIG. 14B, the electronic device may display the notification 1401 transparently so as not to cover the object of the area displayed on the first layer 1403. The notification 1401 may gradually become transparent after the notification 1401 is displayed during a predetermined time. Alternatively, if the gesture of the user is generated in a corresponding area, after the notification is displayed transparently, when the user gesture is generated in another area or a predetermined time has elapsed, the notification may be displayed in an original state.

Figures 15A, 15B, 15C, 15D:
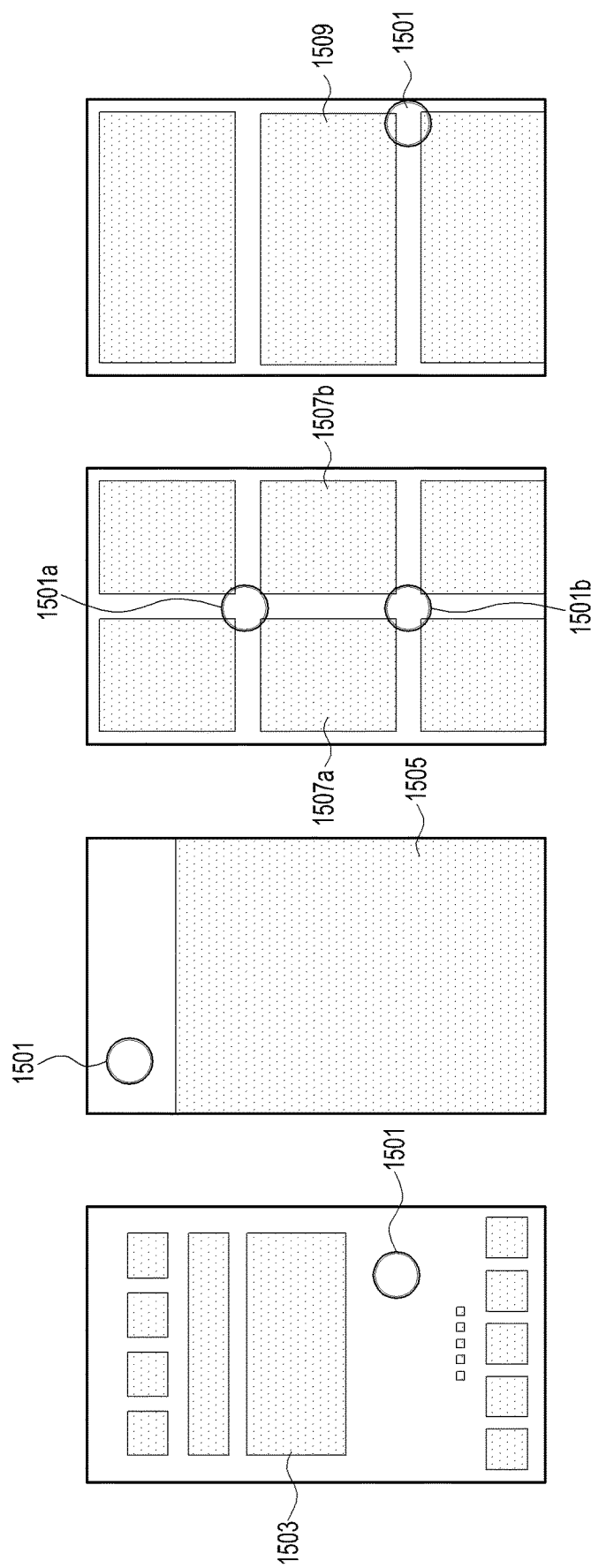
FIGS. 15A to 15D illustrate displays of a notification in an electronic device according to various embodiments of the present disclosure.
Figure 16A:
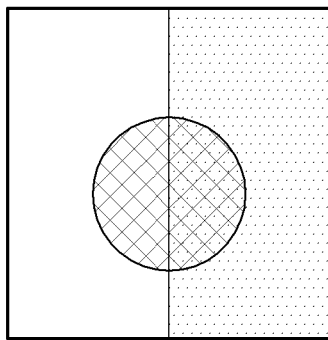
FIGS. 16A to 16F illustrate displays of a notification in an electronic device according to various embodiments of the present disclosure.
Figure 16B:
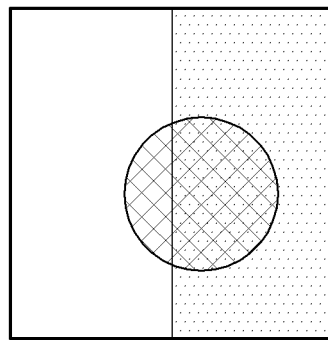
Figure 16C:
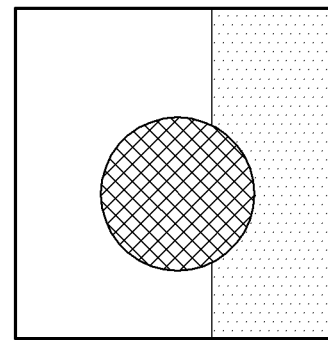
Figure 16D:
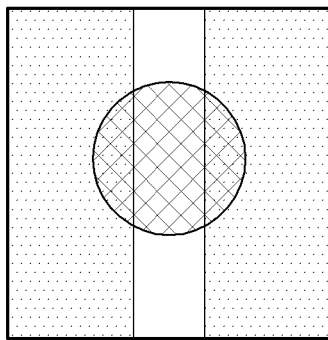
Figure 16E:
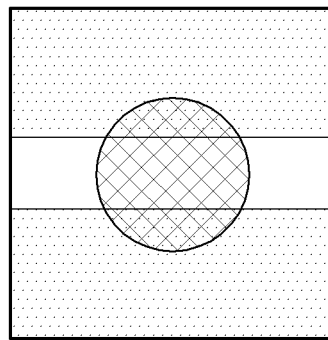
Figure 16F:
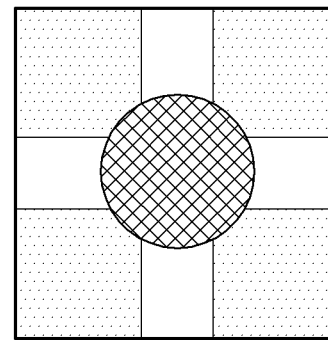

Referring to accompanying FIG. 15, according to various embodiments, when there is an area where the object is not displayed on the first layer, the electronic device may analyze the first layer, and may identify an important object 1503, 1505, 1507a, 1507b, or 1509 watched by the user or determined as an object of which the importance is high in an executed application among the plurality of analyzed objects. The electronic device may search for the notification display area so as not to cover the identified important object, and may display a notification 1501 in the searched area. In addition, referring to accompanying FIGS. 16A to 16E, according to various embodiments, the electronic device may identify the level of the overlap of the objects displayed on the first layer and the notification. As shown in FIGS. 16A, 16B, 16D, and 16E, when the level of the overlap is equal to, or larger than, a predetermined value, the electronic device may display (e.g., fadeout) the overlapped notification area or the overlapped object area such that the overlapped notification area or the overlapped object area becomes thin gradually. Alternatively, the electronic device may display the overlapped notification area or the overlapped object transparently. In addition, the electronic device may change the size or the type of the notification and the object such that the notification and the object do not overlap and display.

Figure 17A:
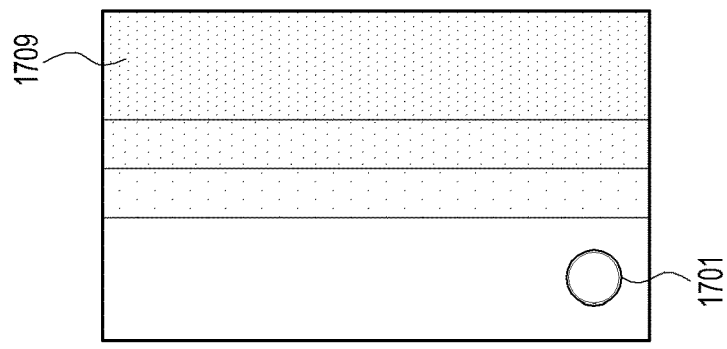
FIGS. 17A to 17D illustrate displays of a notification in an electronic device according to various embodiments of the present disclosure.
Figure 17B:
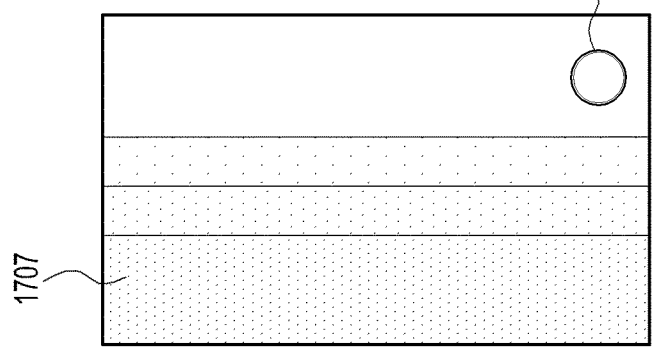
Figure 17C:
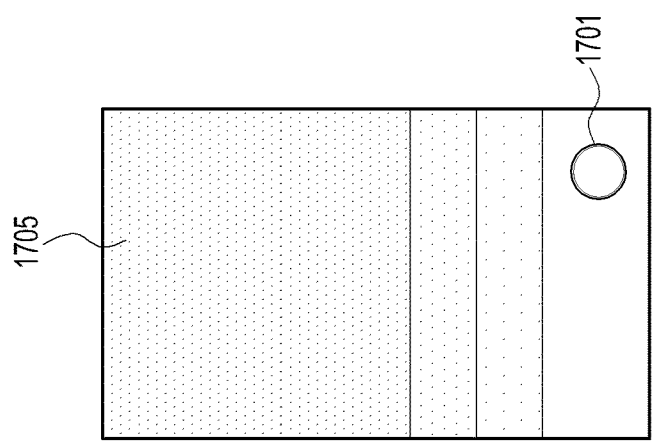
Figure 17D:
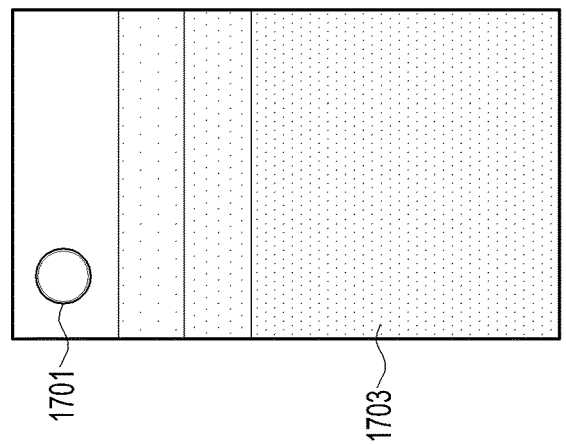

Referring to accompanying FIGS. 17A to 17B, according to various embodiments, the electronic device may determine that an area opposite to the area (e.g., scrolled area) 1703, 1705, 1707, or 1709 where the gesture of the user is generated is the notification display area, and may display a generated notification 1701 in the determined notification display area.

A method of processing a notification in an electronic device, according to one among various embodiments of the present disclosure, may comprises displaying at least one object on a screen; determining a notification display area for displaying a notification on the screen based on a gesture of a user related to at least one object displayed on the screen, and displaying the notification in at least one determined notification display area.

According to various embodiments of the present disclosure, the method may further comprises moving and displaying the displayed notification, on the screen, based on the gesture of the user related to at least one object.

According to various embodiments of the present disclosure, the notification display area may be determined based on information on the gesture of the user and information on at least one object displayed on the screen.

According to various embodiments of the present disclosure, the determining the notification display area may comprises identifying an area where the gesture of the user is generated when an event for the gesture of the user is generated on the screen, and searching for the notification display area in an area except for the identified area.

According to various embodiments of the present disclosure, the determining the notification display area may comprise searching for the notification display area based on use history information according to the gesture of the user, which is previously generated on the screen.

According to various embodiments of the present disclosure, the determining the notification display area may comprise searching for at least one area among an area where at least one object is not displayed, an area where the gesture of the user is not generated, and a determined area, as the notification display area, when at least one object is displayed on some area of a first layer of the screen that includes a plurality of layers.

According to various embodiments of the present disclosure, the determining the notification display area may comprise searching for the notification display area based on a priority of an area where the gesture of the user is not generated in an area where at least one object is not displayed.

According to various embodiments of the present disclosure, the determining the notification display area may comprises identifying a use frequency of at least one area where the gesture of the user is generated based on use history information according to the gesture of the user previously generated on the screen, when there is not the area where at least one object is not displayed, and searching for an area where the identified use frequency is equal to, or smaller than, a predetermined value as the notification display area.

According to various embodiments of the present disclosure, the determining the notification display area may further comprise searching for another notification display area of which the use frequency is next low, except for the area where the gesture of the user is generated, when the gesture of the user is generated in the searched notification display area.

According to various embodiments of the present disclosure, the determining the notification display area may comprises identifying the importance of at least one object based on attribute information on at least one object, configuring a priority of at least one object according to information on the identified importance, and searching for an area where an object of which the configured priority is low is displayed as the notification display area.

According to various embodiments of the present disclosure, the method may further comprise executing a function corresponding to the notification, when the notification displayed on the notification display area is selected.

According to various embodiments of the present disclosure, the displaying the notification may comprise changing at least one of the size, the type, and the transparency of the notification based on information on at least one object, and displaying the notification.

According to various embodiments of the present disclosure, the method may further comprise moving an additional notification to another notification display area where the additional notification does not cover the notification and displaying the additional notification when the additional notification is generated on the screen.

A more specific operation procedure for displaying a notification in an electronic device according to the operation procedure in the electronic device, according to various embodiments of the present disclosure as described above, is specifically described with reference to accompanying figures.

Figure 18:
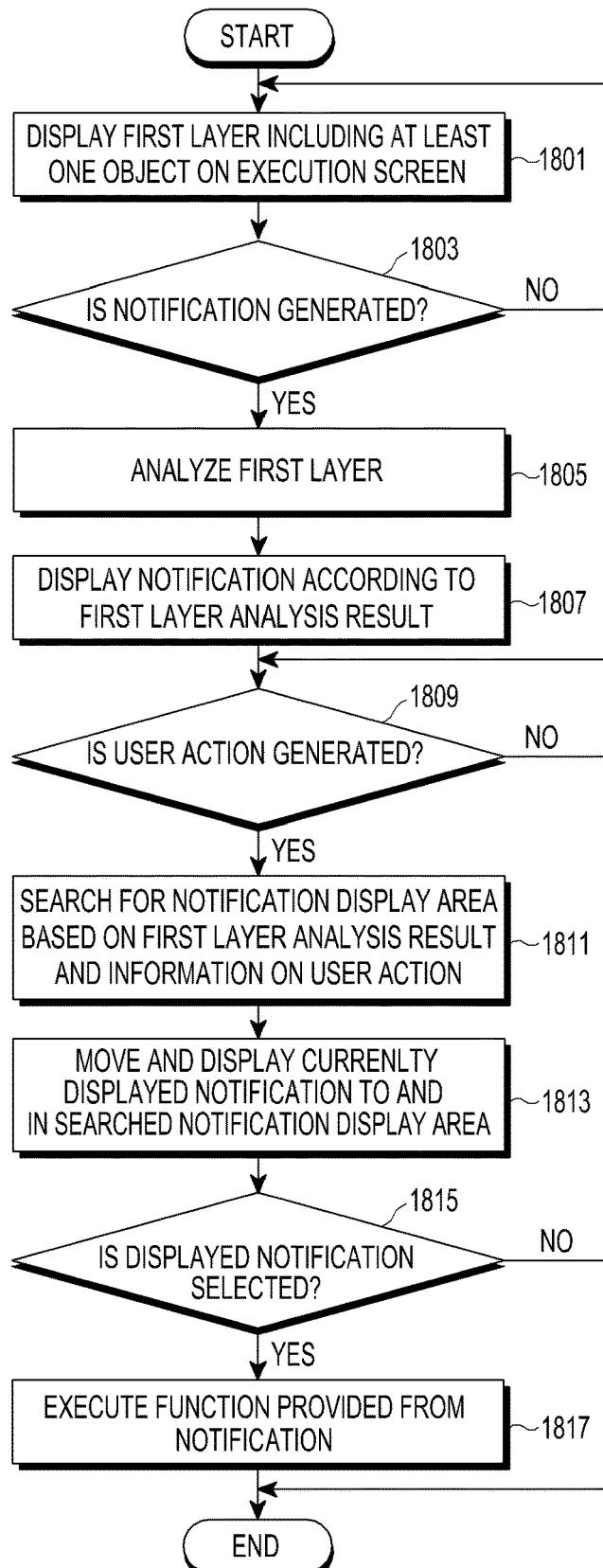
FIG. 18 is a block diagram illustrating a procedure for processing a notification in an electronic device according to various embodiments of the present disclosure.

FIG. 18 is a view illustrating an operation procedure for processing a notification in an electronic device according to various embodiments of the present disclosure.

Referring to FIG. 18, in operation 1801, an electronic device (e.g., the electronic device 101 of FIG. 1), according to various embodiments of the present disclosure, may display an object layer (e.g., a first layer) including at least one object on a screen. The first layer may be displayed on a foundation displayed on the screen. Alternatively, the first layer may be overlaid and displayed on some, or the whole, area of the first layer. In addition, the first layer may be displayed on the whole area of the first layer. Here, an area where the object is not displayed may be displayed transparently.

In operation 1803, the electronic device may identify whether the notification is generated or not. As a result of the identification, when the notification is not generated, the electronic device may perform operation 1801. When the notification is generated, the electronic device may perform operation 1805.

In operation 1805, the electronic device may analyze the first layer. The electronic device may identify an area where the object is displayed on the first layer and an area where the object is not displayed.

In operation 1807, the electronic device may display the notification generated according to the analysis result of the first layer such that a second layer is included in some area on the first layer. That is, the electronic device may display the generated notification in the area where the object is not displayed.

In operation 1809, the electronic device may identify whether the user gesture is generated. As a result of the identification, when the user gesture is not generated, the electronic device may perform operation 1807. When the user action is generated, the electronic device may perform operation 1811.

In operation 1811, the electronic device may search for a notification display area for moving and displaying a currently displayed notification based on the user gesture.

In operation 1813, the electronic device may move and display the currently displayed notification to the searched notification display area.

In operation 1815, the electronic device may identify whether the displayed notification is selected. When the displayed notification is selected by the user, the electronic device may perform operation 1817. When the displayed notification is not selected, the electronic device may perform operation 1815 again.

In operation 1817, the electronic device may perform a function provided from the notification. According to various embodiments, the electronic device may expand and display the notification in order to provide a function related to the selected notification, or may display another notification on the first layer. In addition, according to various embodiments, the electronic device may display a new layer (e.g., a third layer) including at least one object providing a function related to the selected notification in the whole, or some, area on the layer (e.g., a second layer) displaying the notification.

FIGS. 19A to 21B are views illustrating a display example of a notification in an electronic device according to various embodiments of the present disclosure.

Figures 19A, 19B, 19C:
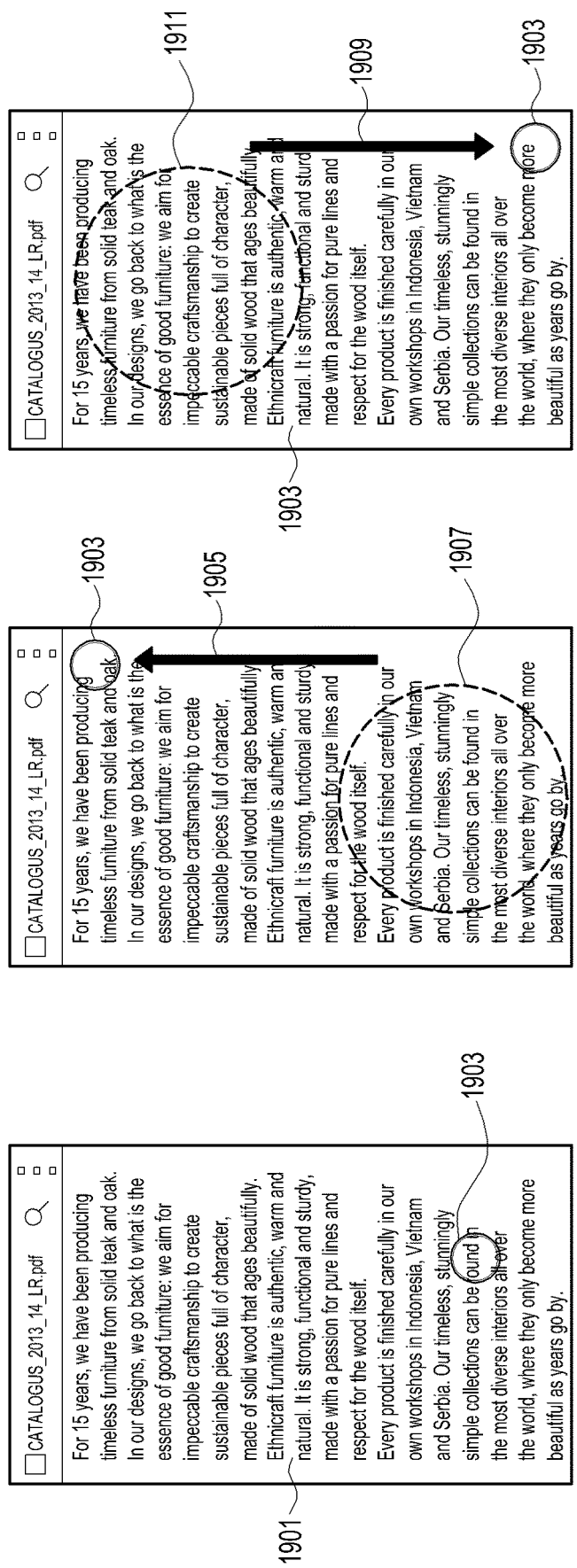
FIGS. 19A to 19C illustrate displays of a notification in an electronic device according to various embodiments of the present disclosure.

Referring to FIGS. 19A to 19C, as shown in FIG. 19A, the electronic device according to various embodiments may display a first layer 1901 on the screen, and may display a second layer including a notification 1903 on the first layer 1901. The electronic device may identify the user gesture (e.g., a scroll action of the user). According to various embodiments, as shown in FIG. 19B, when the scroll action moves upward, the electronic device may determine that the user watches a lower area of the screen. The electronic device may move and display the notification 1903 displayed in the lower area to and in the upper area opposite to the area where the user gesture is generated. In addition, according to various embodiments, as shown in FIG. 19C, when the scroll action moves downward on the screen, the electronic device may determine that the user watches the upper area of the screen. The electronic device may move and display the notification 1903 displayed in the upper area to and in the lower area opposite to the area where the user gesture is generated.

Figures 20A, 20B, 20C:
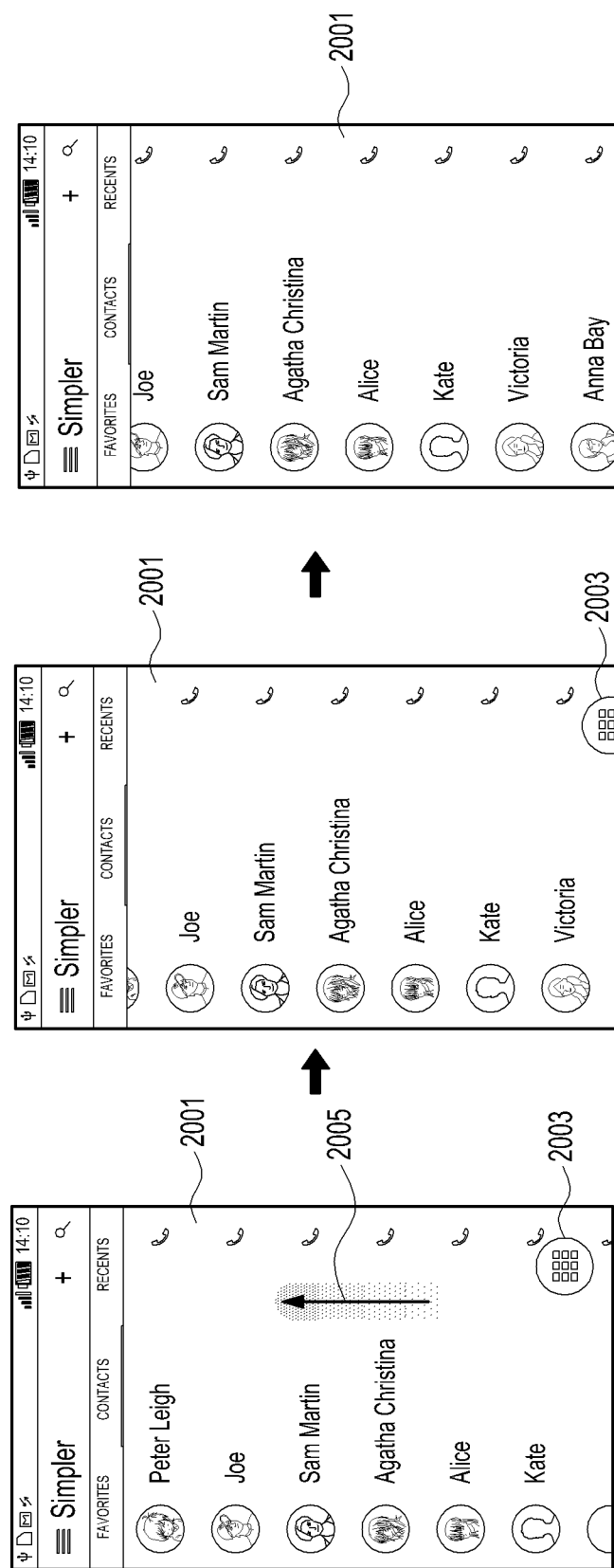
FIGS. 20A to 20C illustrate displays of a notification in an electronic device according to various embodiments of the present disclosure.

Referring to FIGS. 20A to 20C, as shown in FIG. 20A, the electronic device may display a first layer 2001 on the screen, and may display a second layer including a notification 2003 on the first layer 2001. When the user gesture (e.g., a scroll action of the user) 2005 is generated, as shown in FIG. 20B, the electronic device may move the notification 2003 downward such that the notification 2003 is not shown in a current screen. As shown in FIG. 20C, the electronic device may enable the notification 2003 to disappear in the screen in order to more prominently display the first layer 2001. The notification 2003 that disappeared in the screen may be displayed again, after a predetermined time, on the first layer 2001 when a specific gesture of the user is generated, a button is input, or a scroll operation is finished. When the electronic device displays the notification 2003 again, the electronic device may display the notification 2003 in a previous notification area. Alternatively, the electronic device may search for a notification area again in the first layer 2001, which is scrolled and currently displayed, and may display the notification 2003 in the searched new notification area.

In addition, according to various embodiments, when the user gesture (e.g., a scroll operation of the user) 2005 is generated, the electronic device may gradually display the notification displayed on the first layer thinly or transparently. The electronic device may display the thinly or transparently displayed notification again on the first layer when a specific gesture of the user is generated, a button is input, or a scroll operation is finished after a predetermined time has elapsed.

Figure 21A:
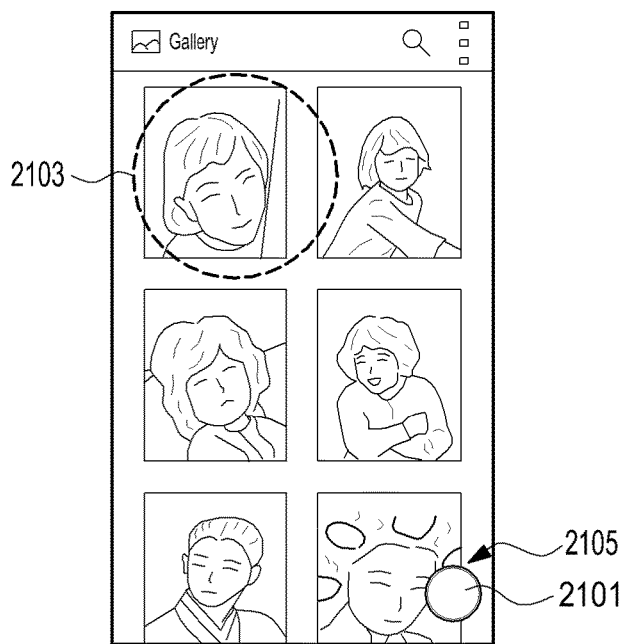
FIGS. 21A and 21B illustrate displays of a notification in an electronic device according to various embodiments of the present disclosure.
Figure 21B:
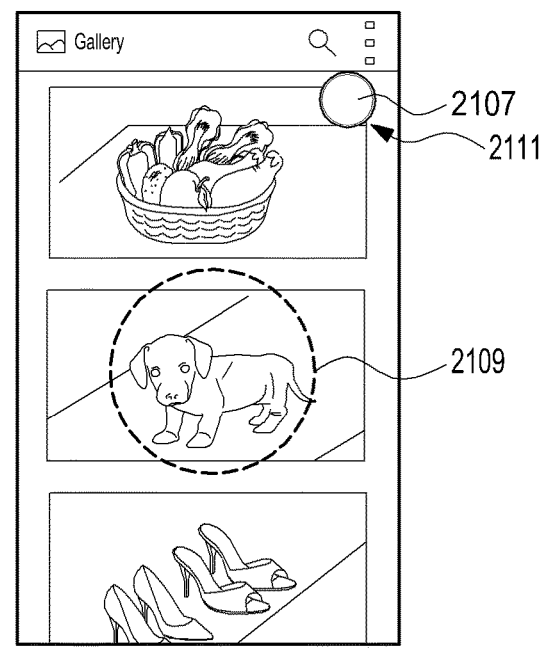

According to various embodiments, the electronic device may obtain information on the chase of an eye of a user using a sensor (e.g., a camera sensor) for an eye chase. The electronic device may identify an area where the user currently watches on the screen on which an application is executed based on the obtained information on the eye chase of the user. In addition, the electronic device may chase eye of the user positioned far as well as the user positioned closely. Referring to FIGS. 21A and 21B, according to various embodiments of the present disclosure, the electronic device may determine an area (e.g., a top area 2103 or a central area 2107) where the user currently watches, based on information according to the eye chase, and may move and display a notification 2101 to and in an area 2105 or 2109 opposite to the determined area 2103 or 2107.

Figure 22:
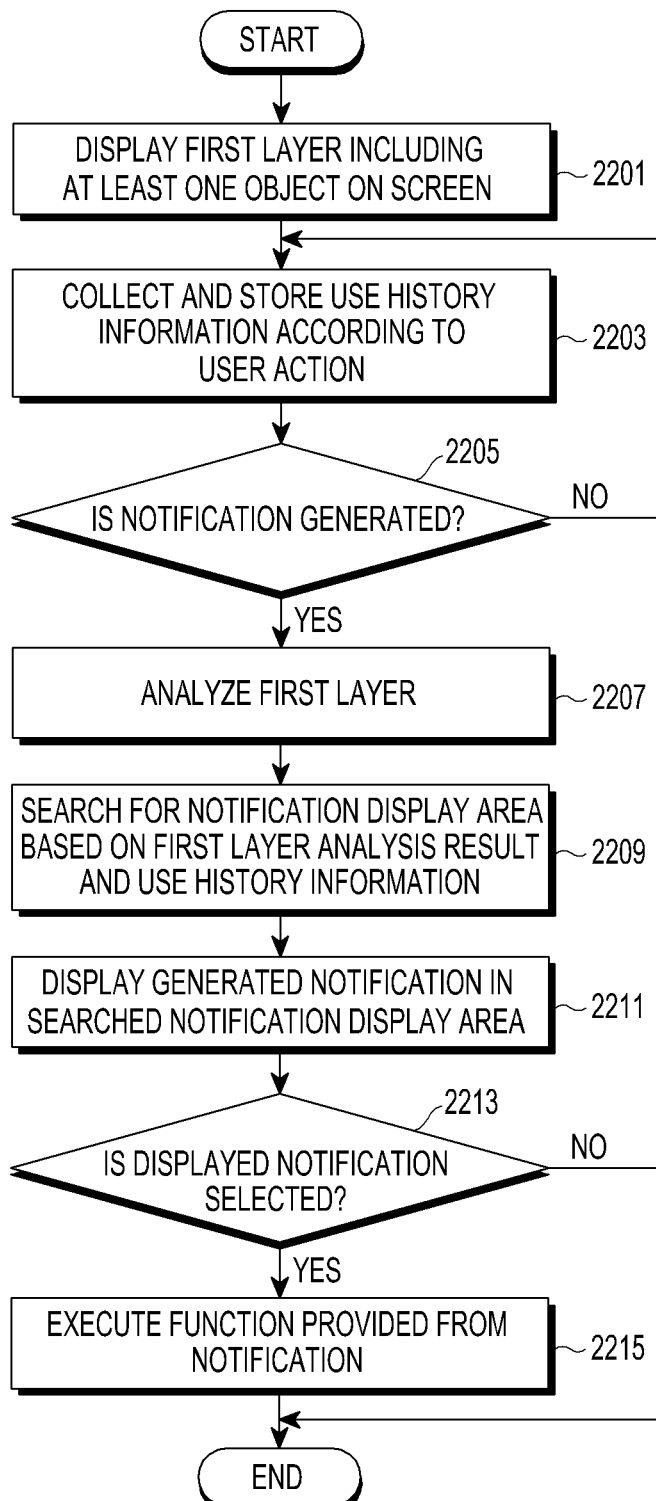
FIG. 22 is a block diagram illustrating a procedure for processing a notification in an electronic device according to various embodiments of the present disclosure.

FIG. 22 is a view illustrating an operation procedure for processing a notification in an electronic device according to various embodiments.

Referring to FIG. 22, in operation 2201, an electronic device (e.g., the electronic device 101 of FIG. 1), according to various embodiments of the present disclosure, may display an object layer (e.g., a first layer) including at least one object on a screen. The first layer is displayed on a foundation layer. The first layer may be overlaid and displayed on some area or the whole area on the first layer. The first layer may be displayed in the whole area of the first layer and an area where an object is not displayed may be displayed transparently.

In operation 2203, the electronic device may collect and store use history information according to a user gesture. According to various embodiments, when a user gesture event is generated on the first layer, the electronic device collects information (e.g., at least one of a scroll, a touch, a drag, a swipe, and an eye chase of the user) according to the generated user gesture event, and may store the collected information in an information DB related to the user gesture as the use history information. In addition, the electronic device may determine an area where the user gesture is generated based on the collected information, and may store position information of the determined area where the user gesture is generated as the use history information.

In operation 2205, the electronic device may identify whether the notification is generated. As a result of the identification, when the notification is not generated, the electronic device may perform operation 2203. When the notification is generated, the electronic device may perform operation 2207.

In operation 2207, the electronic device may analyze the first layer, and may identify an area where an object is displayed on the first layer and an area where the object is not displayed.

In operation 2209, the electronic device may search for a notification display area for displaying the generated notification based on the analysis result of the first layer and the stored use history information. That is, the electronic device may search for the area where the object is not displayed and an area where the gesture of the user is not generated in the past.

In operation 2211, the electronic device may display the generated notification in the searched notification display area.

In operation 2213, the electronic device may identify whether the displayed notification is selected. When the displayed notification is selected by the user, the electronic device may perform operation 2215. When the displayed notification is not selected, the electronic device may perform operation 2211 again.

In operation 2215, the electronic device may perform a function provided from the notification. According to various embodiments, the electronic device may expand and display the notification in order to provide a function related to the selected notification, or may display another notification on the first layer. In addition, according to various embodiments, the electronic device may display a new layer (e.g., a third layer) including at least one object providing a function related to the selected notification on the layer (e.g., a second layer) displaying the notification.

Figure 28:
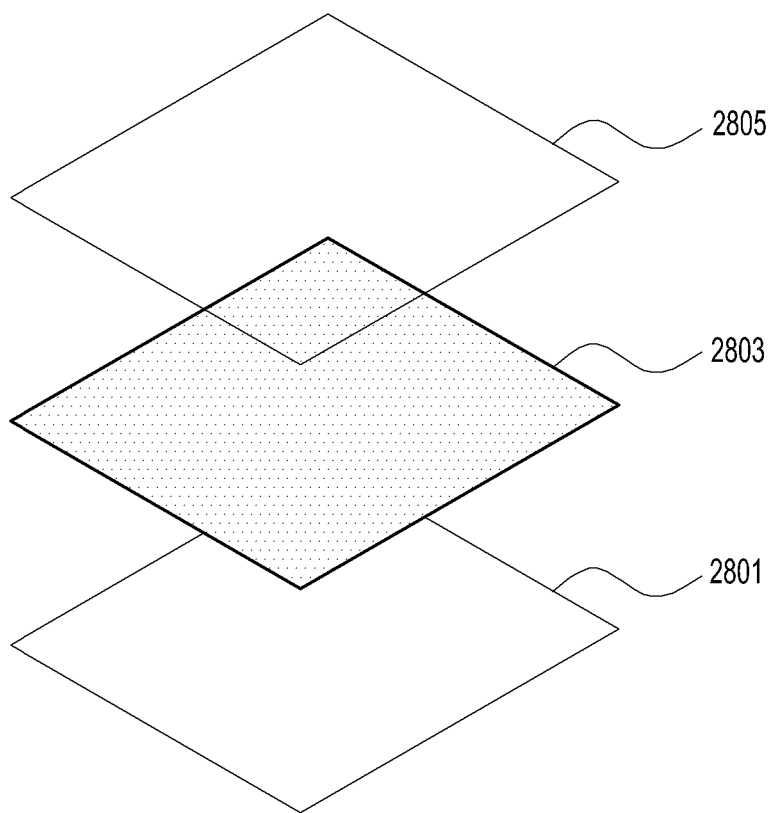
FIG. 28 illustrates layers displayed on a screen in an electronic device according to various embodiments of the present disclosure.

FIGS. 23A to 27E are views illustrating a display example of a notification in an electronic device according to various embodiments of the present disclosure. FIG. 28 is a view illustrating an example of layers displayed on a screen in an electronic device according to various embodiments of the present disclosure.

Referring to FIGS. 23A and 23B, the electronic device may display a main button 2301a, 2301b or 2301c displayed on the screen of the electronic device or at least one object (e.g., contents) 2303, and may display a pop-up window 2305c on a first layer. In addition, for example, as shown in FIG. 23B, the electronic device may display a screen 2305a or 2305b on which an object is moved according to a scroll operation. The electronic device may detect at least one of the number, position, importance and time according to the use or the scroll operation of the displayed main button 2301a, 2301b or 2301c, the pop-up window 2305c, and at least one object (e.g., contents) 2303, and may generate the detected result as use history information. In addition, the electronic device may identify an area where the use or the scroll operation of the main button 2301a, 2301b, or 2301c displayed on the first layer using the use history information, the pop-up window 2305c, and at least one object 2303 is generated. The electronic device may search for some area among areas except for the identified area as the notification display area.

Referring to FIGS. 24A and 24B, the electronic device may identify an area 2401a, 2401b, 2403a, or 2403b where a gesture of a user is generated in the past based on the use history information previously stored according to the gesture of the user. The electronic device may divide an area except for the identified area 2401a, 2401b, 2403a, or 2403b, may search for a notification display area in the divided area 2405, and may display a notification 2407 generated in the searched notification area. According to various embodiments, when the electronic device uses the main button 2301a or 2301b, or at least one object 2303 of FIG. 23, information (e.g., at least one of the position, the use number, the importance, and the time) on a first area 2401a or 2401b of FIGS. 24A and 24B may be generated as the use history information. In addition, according to various embodiments, when the electronic device uses information according to the use of the scroll operation 2303, or the main button 2301c and the pop-up window 2305c, information (e.g., at least one of the position, the use number, the importance, and the time) on a second area 2403a or 2403b of FIGS. 24A and 24B may be generated as the use history information. In addition, according to various embodiments, the electronic device may determine a priority according to the main button, the object, the use of another notification, the use number (or frequency) according to the user gesture operation, or the importance. The electronic device may search for an empty area adjacent to an area of the use history information of which the priority is low as the notification display area. According to various embodiments, the electronic device may search for the notification display area in a low use frequency sequence. When the user gesture is generated in the searched notification display area, the electronic device may search for another notification display area of which the use frequency is next low except for the area where the user gesture is generated.

Figure 25A:
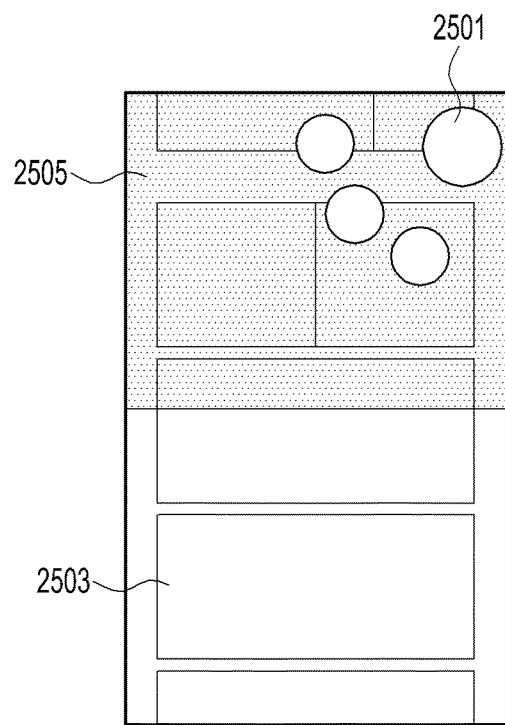
FIGS. 25A and 25B illustrate displays of a notification in an electronic device according to various embodiments of the present disclosure.
Figure 25B:
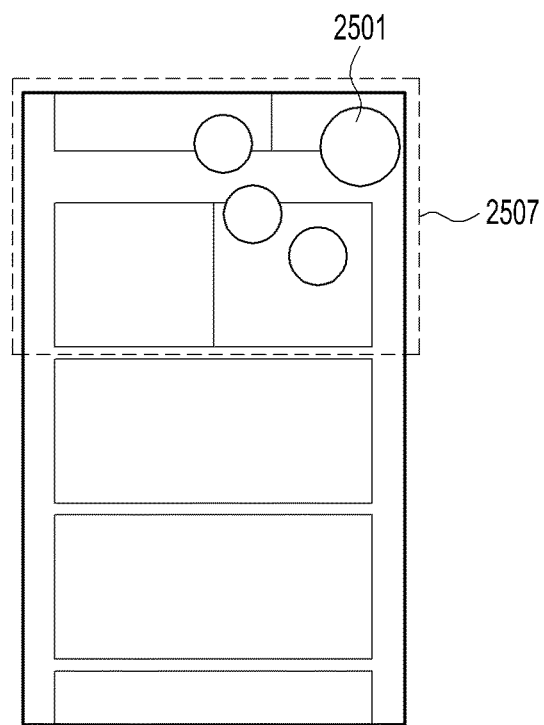

In addition, according to various embodiments of the present disclosure, as shown in FIGS. 25A and 25B, the electronic device may display a first layer 2503 including at least one object on the screen, and when the notification is generated, the electronic device may display a second layer 2505 including the generated notification 2501. Some area of the first layer 2503 may be overlaid on the second layer 2505 and the second layer 2505 may be displayed. According to various embodiments, the second layer 2505 may not perform a dim process on the whole area of the first layer 2503, may perform a dim process on some area of the first layer 2503, or may process the first layer 2503 transparently to display the first layer 2503 such that the objects displayed on the first layer 2503 may be identified.

Figure 26A:
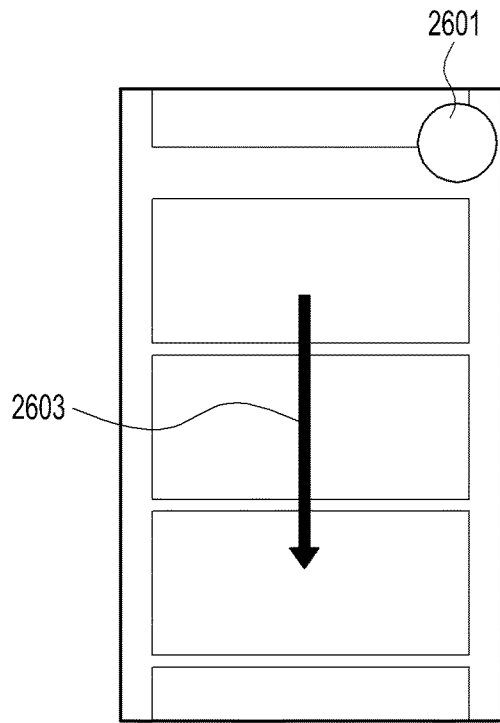
FIGS. 26A and 26B illustrate displays of a notification in an electronic device according to various embodiments of the present disclosure.
Figure 26B:
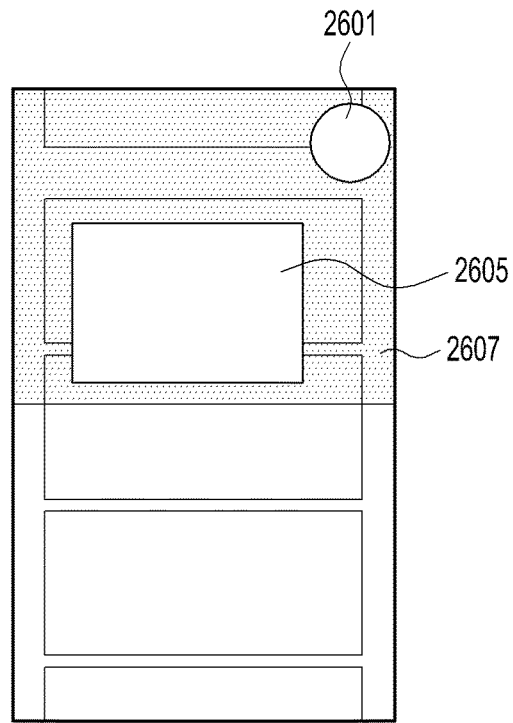

According to various embodiments of the present disclosure, as shown in FIGS. 26A and 26B, the electronic device may display a notification 2605 for a function corresponding to a notification 2601 that is different according to the gesture (e.g., a scroll operation 2603) of the user. According to the display of another notification 2601, the electronic device may not perform a dim process on the whole area of the second layer. The second layer may be moved and the dim process may be performed on some area of the second layer, or the second layer may be transparently processed such that an object of the first layer may be identified.

In addition, referring to FIGS. 27A to 27E, in a state in which a notification 2701 is displayed on the screen, for example, the electronic device may display an indicator 2703 or another notification 2705, 2707 or 2709. In an embodiment, the electronic device may search for another notification display area, and may display or move and display another newly generated notification 2705, 2707 or 2709 to and on another searched notification display area, such that the indicator 2703 or another notification 2705, 2707 or 2709 does not overlap the previously displayed notification 2701. As shown in FIG. 28, another notification 2705, 2707 or 2709 may be included in a third layer 2805 displayed on a second layer 2803 displaying the notification 2701, and may be displayed. The second layer 2803 may be displayed on a first layer 2801 including at least one object.

FIGS. 29A to 30B are views illustrating a display example of a notification in an electronic device according to various embodiments of the present disclosure.

Figure 29A:
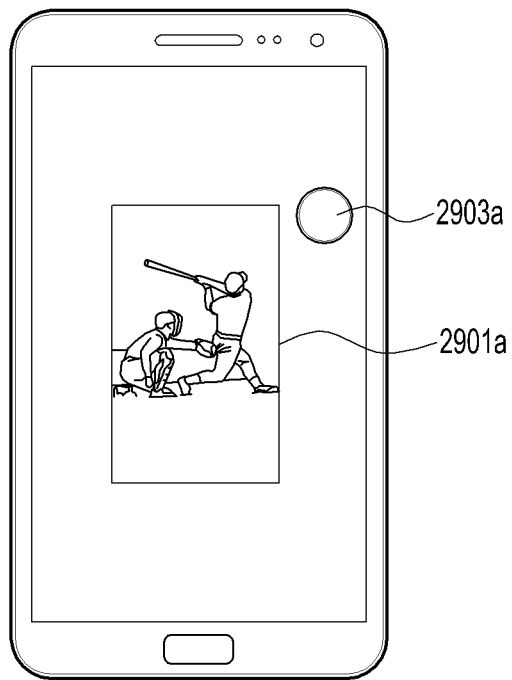
FIGS. 29A to 29D illustrate displays of a notification in an electronic device according to various embodiments of the present disclosure.
Figure 29B:
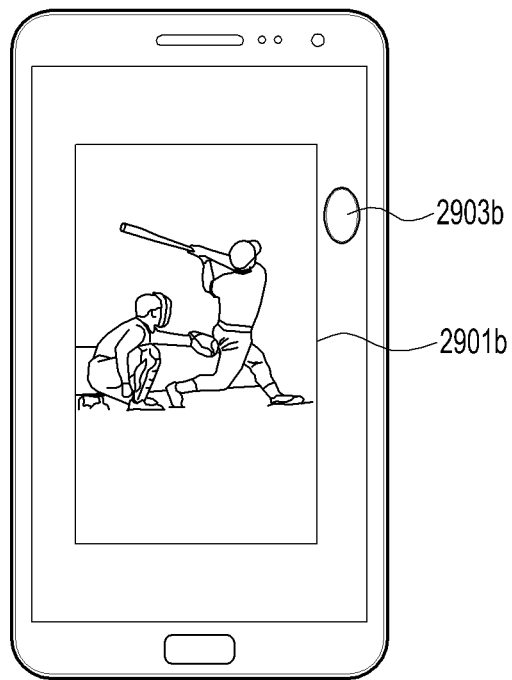
Figure 29C:
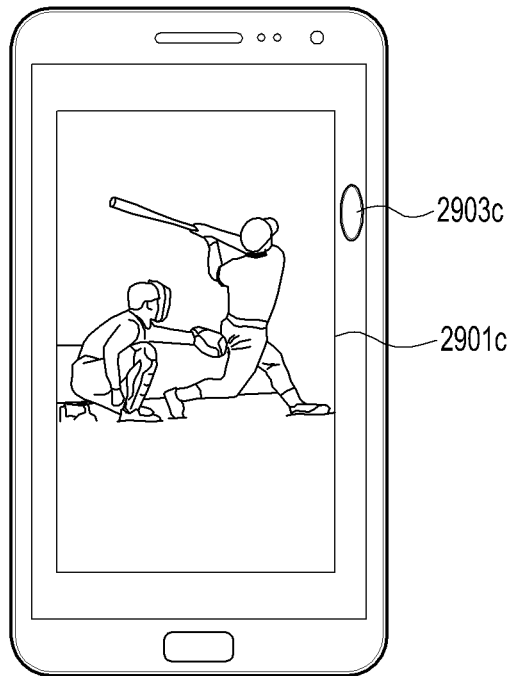
Figure 29D:
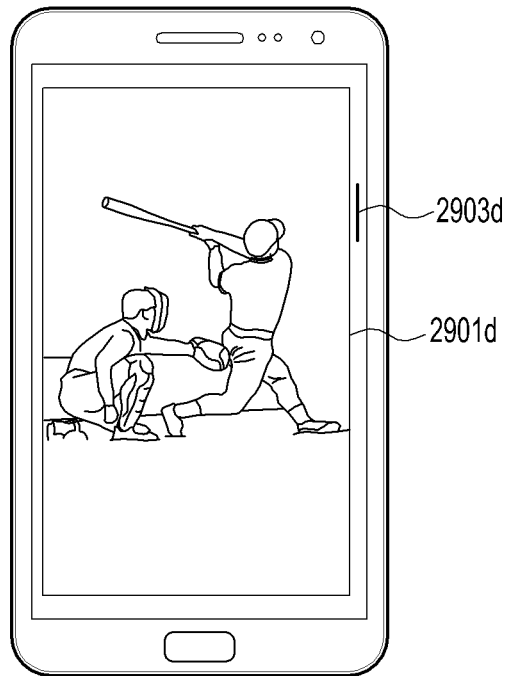
Figures 30A, 30B:
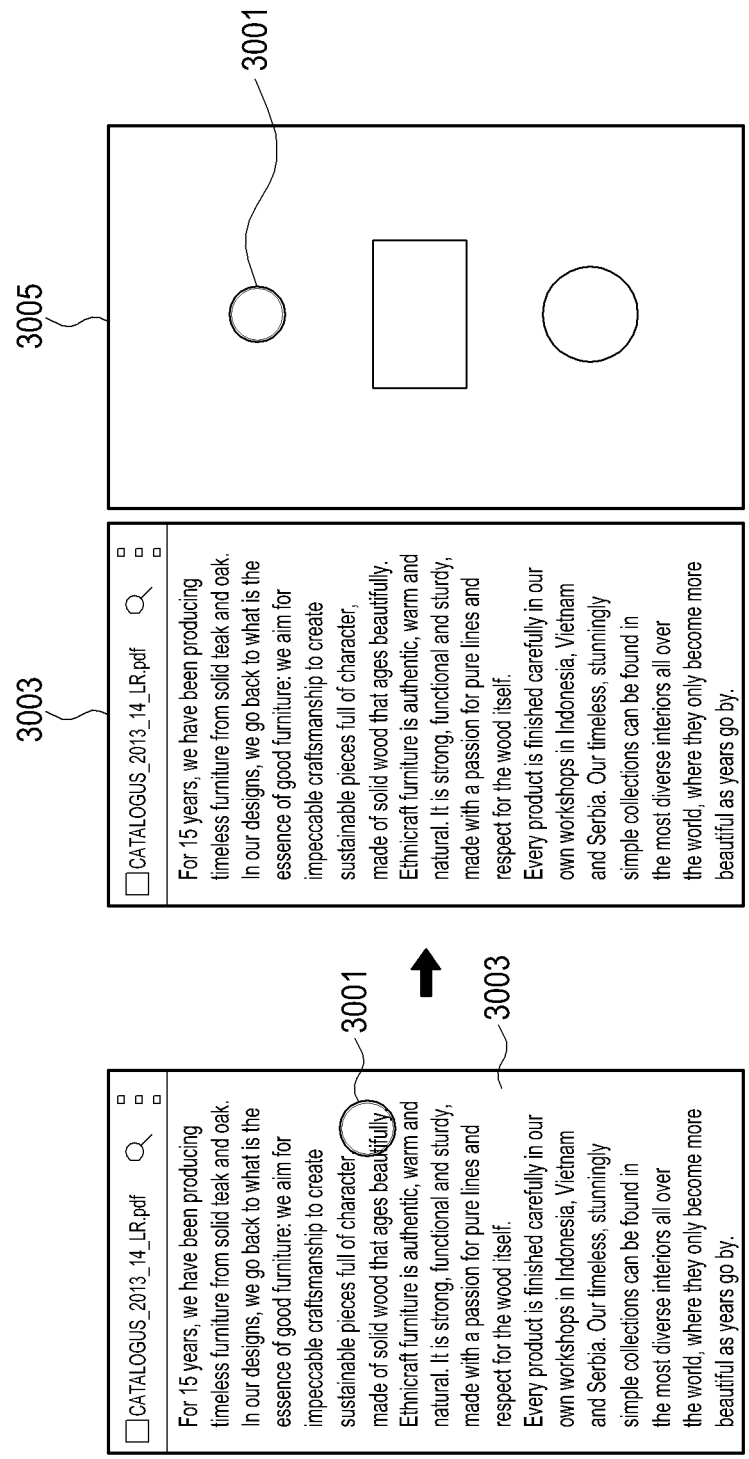
FIGS. 30A and 30B illustrate displays of a notification in an electronic device according to various embodiments of the present disclosure.

Referring to FIGS. 29A to 29D, according to various embodiments of the present disclosure, as shown in FIG. 29A, the electronic device may display an object 2901a included in a first layer, and may display a notification 2903a on the first layer. As shown in FIGS. 29B and 29C, when objects 2901b and 2901c displayed on the first layer is expanded, since notifications 2903b and 2903c overlap the objects 2901b and 2901c, the electronic device may change the sizes or types of the notifications 2903b and 2903c. As shown in FIG. 29D, when an object 2901d is more expanded and overlaps the notification 2901d, the electronic device may display the notification 2901d in at least one of a point type or a line type such that the notification 2901d is to disappear. Referring to FIGS. 30A and 30B, according to various embodiments of the present disclosure, the electronic device may display the first layer including an object on a screen 3003 of a first display, and may display a notification 3001 on the first layer. After the notification 3001 is displayed or when the notification 3001 is generated, the electronic device may move the notification 3001 to a screen 3005 of a second display to display the notification 3001 on the screen 3005 of the second display. The second display may include another display (e.g., an expanded display or a flexible display) installed in the electronic device, and a display of another external electronic device (e.g., at least one of an external display device, a wearable device and an external terminal device) linked with the electronic device. The screen 3005 of the second display may display the currently generated notification 3001 together with previously generated notifications, and may change a display state (e.g., at least one of a display, an addition, and a deletion of notification history information) of notifications displayed according to a configuration of a user.

In addition, according to various embodiments, when the electronic device divides and uses a screen of a display, for example when a user uses an object displayed on a divided first screen, that is, for example when a gesture of the user is generated in the divided first screen, the electronic device may display a notification in a divided second screen.

Figure 31:
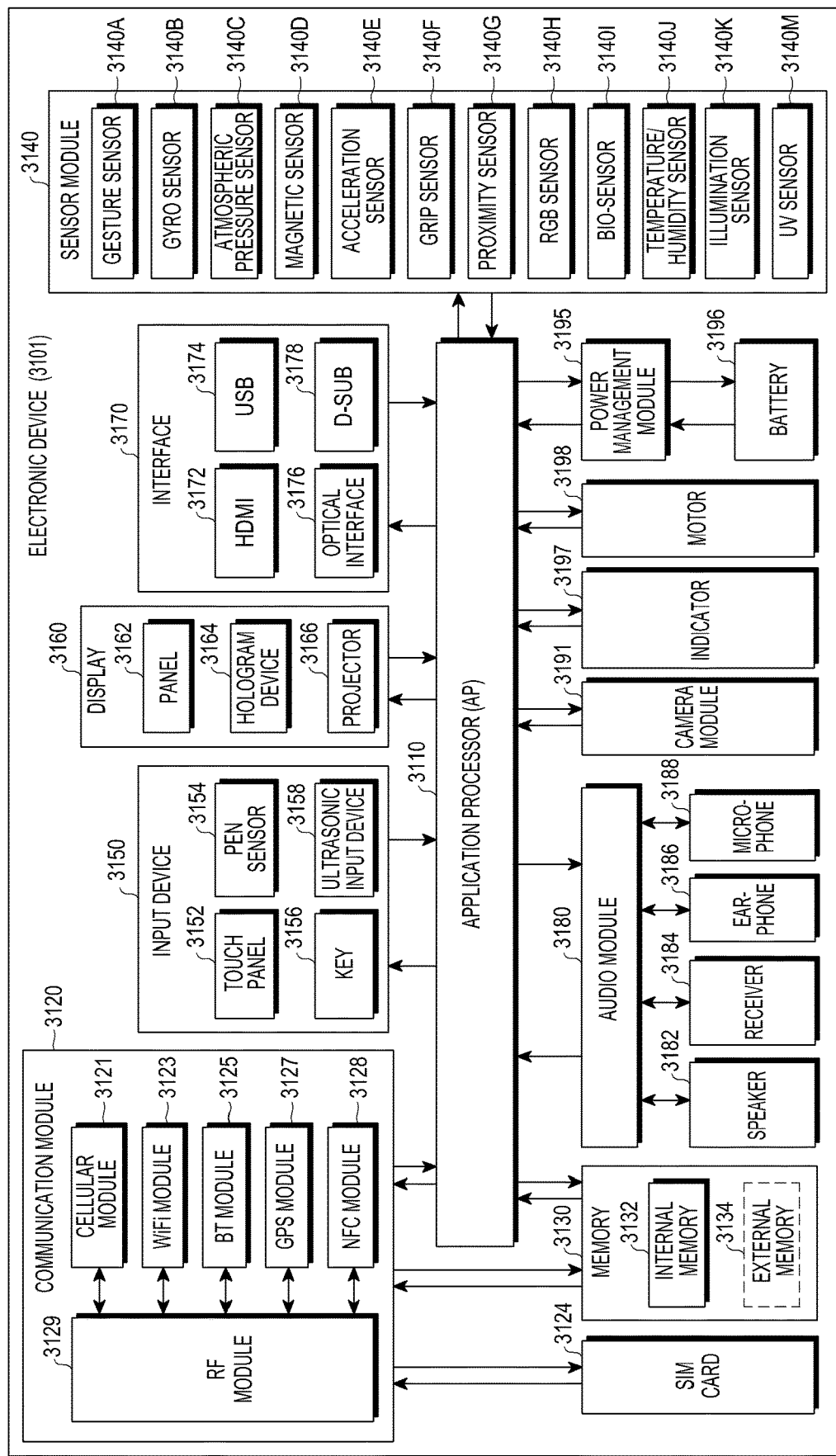
FIG. 31 is a block diagram of an electronic device according to various embodiments.

FIG. 31 is a block diagram of an electronic device 3101 according to various embodiments. The electronic device 3101 may include, for example, the whole or part of the electronic device 101 illustrated in FIG. 1. The electronic device 3101 may include at least one Application Processor (AP) 3110, a communication module 3120, a subscriber identification module 3124, a memory 3130, a sensor module 3140, an input device 3150, a display 3160, an interface 3170, an audio module 3180, a camera module 3191, a power management module 3195, a battery 3196, an indicator 3197, and a motor 3198.

The processor 3110 may control a plurality of hardware or software components connected to the processor 3110 by driving an operating system or an application program and perform processing of various pieces of data and calculations. The processor 3110 may be implemented by, for example, a System on Chip (SoC). According to an embodiment, the processor 3110 may further include a Graphic Processing Unit (GPU) and/or an image signal processor. The processor 3110 may include at least some (for example, a cellular module 3121) of the elements illustrated in FIG. 31. The processor 3110 may load, into a volatile memory, instructions or data received from at least one (for example, a non-volatile memory) of the other elements and may process the loaded instructions or data, and may store various data in a non-volatile memory.

The communication module 3120 may include a configuration that is equal, or similar, to that of the communication interface 170 of FIG. 1. The communication module 3120 may include, for example, a cellular module 3121, a Wi-Fi module 3123, a Bluetooth module 3125, a GNSS module 3127 (e.g., a GPS module, a Glonass module, a Beidou module, or a Galileo module), an NFC module 3128, and a Radio Frequency (RF) module 3129.

The cellular module 3121 may provide a voice call, an image call, a text message service, or an Internet service through, for example, a communication network. According to an embodiment, the cellular module 3121 may distinguish between and authenticate electronic devices 3101 within a communication network using a subscriber identification module (for example, the SIM card 3124). According to an embodiment, the cellular module 3121 may perform at least some of the functions that the processor 3110 may provide. According to an embodiment, the cellular module 3121 may include a Communication Processor (CP).

The Wi-Fi module 3123, the Bluetooth module 3125, the GNSS module 3127, or the NFC module 3128 may include, for example, a processor that processes data transmitted and received through the corresponding module. According to some embodiments, at least some (two or more) of the cellular module 3121, the Wi-Fi module 3123, the BT module 3125, the GNSS module 3127, and the NFC module 3128 may be included in one Integrated Chip (IC) or IC package.

The RF module 3129 may transmit/receive, for example, a communication signal (for example, an RF signal). The RF module 3129 may include, for example, a transceiver, a Power Amp Module (PAM), a frequency filter, a Low Noise Amplifier (LNA), or an antenna. According to another embodiment of the present disclosure, at least one of the cellular module 3121, the Wi-Fi module 3123, the BT module 3125, the GNSS module 3127, and the NFC module 3128 may transmit/receive an RF signal through a separate RF module.

The subscriber identification module 3124 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 3130 (for example, the memory 130) may include, for example, an internal memory 3132 or an external memory 3134. The internal memory 3132 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard driver, or a Solid State Drive (SSD).

The external memory 3134 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 3134 may be functionally and/or physically connected to the electronic device 3101 through various interfaces.

The sensor module 3140 may measure a physical quantity or detect an operation state of the electronic device 3101, and may convert the measured or detected information into an electrical signal. The sensor module 3140 may include, for example, at least one of a gesture sensor 3140A, a gyro sensor 3140B, an atmospheric pressure sensor 3140C, a magnetic sensor 3140D, an acceleration sensor 3140E, a grip sensor 3140F, a proximity sensor 3140G, a color sensor 3140H (for example, a red, green, blue (RGB) sensor), a biometric sensor 3140I, a temperature/humidity sensor 3140J, a light sensor 3140K, and a ultraviolet (UV) sensor 3140M. Additionally or alternatively, the sensor module 3140 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 3140 may further include a control circuit for controlling one or more sensors included therein. In some embodiments, an electronic device 3101 may further include a processor configured to control the sensor module 3140 as a part of, or separately from, the processor 3110, and may control the sensor module 3140 when the processor 3110 is in a sleep state.

The input device 3150 may include, for example, a touch panel 3152, a (digital) pen sensor 3154, a key 3156, and an ultrasonic input unit 3158. The touch panel 3152 may use at least one of, for example, a capacitive scheme, a resistive scheme, an infrared scheme, and an ultrasonic scheme. Further, the touch panel 3152 may further include a control circuit. The touch panel 3152 may further include a tactile layer and may provide a tactile reaction to the user.

The (digital) pen sensor 3154 may include, for example, a recognition sheet, which is a part of the touch panel or is separated from the touch panel. The key 3156 may include, for example, a physical button, an optical key, or a keypad. The ultrasonic input device 3158 may detect ultrasonic waves generated by an input tool through a microphone (for example, the microphone 3188) and may identify data corresponding to the detected ultrasonic waves.

The display 3160 (for example, the display 160) may include a panel 3162, a hologram device 3164 or a projector 3166. The panel 3162 may include a configuration that is identical, or similar, to that of the display 160 illustrated in FIG. 1. The panel 3162 may be implemented to be, for example, flexible, transparent, or wearable. The panel 3162 and the touch panel 3152 may be implemented as one module. The hologram 3164 may show a three dimensional image in the air by using an interference of light. The projector 3166 may display an image by projecting light onto a screen. The screen may be located, for example, in the interior of, or on the exterior of, the electronic device 3101. According to an exemplary embodiment, the display 3160 may further include a control circuit for controlling the panel 3162, the hologram device 3164, or the projector 3166.

The interface 3170 may include, for example, a High-Definition Multimedia Interface (HDMI) 3172, a Universal Serial Bus (USB) 3174, an optical interface 3176, or a D-subminiature (D-sub) 3178. The interface 3170 may be included in, for example, the communication interface 170 illustrated in FIG. 1. Additionally or alternatively, the interface 3170 may include, for example, a Mobile High-definition Link (MHL) interface, a Secure Digital (SD) card/Multi-Media Card (MMC) interface, or an Infrared Data Association (IrDA) standard interface.

The audio module 3180 may bilaterally convert, for example, a sound and an electrical signal. At least some elements of the audio module 3180 may be included in, for example, the input/output interface 150 illustrated in FIG. 1. The audio module 3180 may process sound information that is input or output through, for example, a speaker 3182, a receiver 3184, earphones 3186, the microphone 3188, or the like.

The camera module 3191 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 3195 may manage, for example, power of the electronic device 3101. According to an embodiment, the power management module 3195 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 3196, and a voltage, a current, or a temperature during the charging. The battery 3196 may include, for example, a rechargeable battery or a solar battery.

The indicator 3197 may indicate a state (for example, a booting state, a message state, a charging state, or the like) of the electronic device 3101 or a part (for example, the processor 3110) of the electronic device 3101. The motor 3198 may convert an electrical signal into a mechanical vibration, and may generate a vibration, a haptic effect, or the like. Although not illustrated, the electronic device 3101 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO®.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 32:
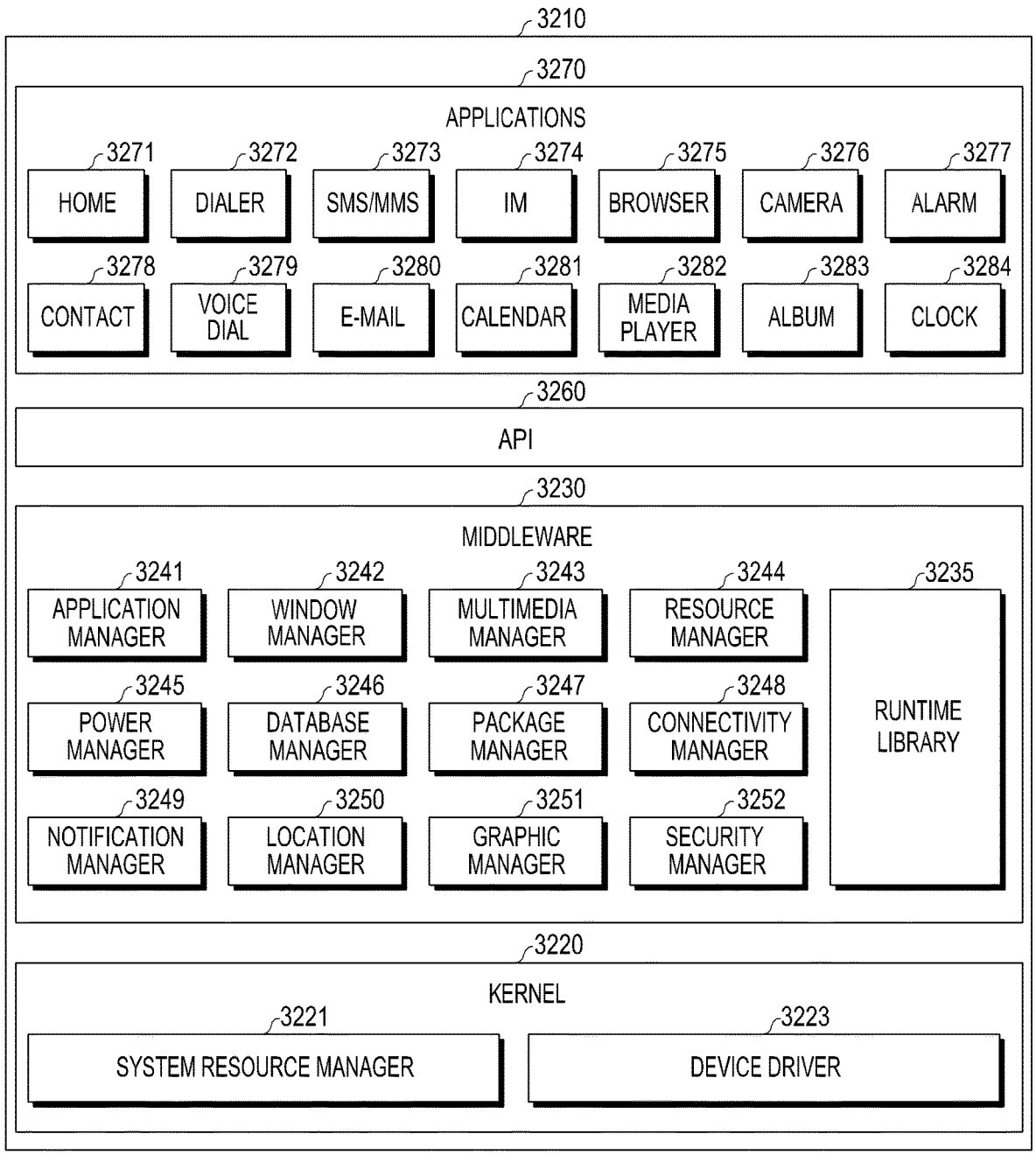
FIG. 32 is a block diagram of a program module of an electronic device according to various embodiments.

FIG. 32 is a block diagram of a program module of an electronic device according to various embodiments. According to an embodiment, the program module 3210 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 3210 may include a kernel 3220, middleware 3230, an Application Programming Interface (API) 3260, and/or applications 3270. At least some of the program module 3210 may be preloaded on the electronic device, or may be downloaded from an external electronic device (for example, the electronic device 102 or 104, or the server 106).

The kernel 3220 (for example, the kernel 141) may include, for example, a system resource manager 3221 and/or a device driver 3223. The system resource manager 3221 may control, assign, or collect system resources. According to an embodiment, the system resource manager 3221 may include a process manager, a memory manager, or a file system manager. The device driver 3223 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 3230 may provide a function used by the applications 3270 in common or may provide various functions to the applications 3270 through the API 3260 so that the applications 3270 can efficiently use limited system resources within the electronic device. According to an embodiment, the middleware 3230 (for example, the middleware 143) may include, for example, at least one of a runtime library 3235, an application manager 3241, a window manager 3242, a multimedia manager 3243, a resource manager 3244, a power manager 3245, a database manager 3246, a package manager 3247, a connectivity manager 3248, a notification manager 3249, a location manager 3250, a graphic manager 3251, and a security manager 3252.

The runtime library 3235 may include, for example, a library module that a compiler uses in order to add new functions through a programming language when the applications 3270 are executed. The runtime library 3235 may perform input/output management, memory management, or a function for an arithmetic function.

The application manager 3241 may, for example, manage a life cycle of at least one of the applications 3270. The window manager 3242 may manage Graphical User Interface (GUI) resources used on a screen. The multimedia manager 3243 may identify formats used for the reproduction of various media files and encode or decode a media file using a codec suitable for the corresponding format. The resource manager 3244 may manage resources of at least one of the applications 3270, such as a source code, a memory, and a storage space.

The power manager 3245 may operate together with, for example, a Basic Input/Output System (BIOS) to manage a battery or power and may provide power information used for the operation of the electronic device. The database manager 3246 may generate, search, or change a database to be used in at least one of the applications 3270. The package manager 3247 may manage the installation or the updating of an application distributed in the form of a package file.

The connectivity manager 3248 may manage a wireless connection, such as, for example, Wi-Fi or Bluetooth. The notification manager 3249 may display or notify of an event, such as an arrival message, an appointment, a proximity notification, and the like, in such a manner that a user is not disturbed. The location manager 3250 may manage location information of the electronic device. The graphic manager 3251 may manage a graphic effect to be provided to a user and a user interface relating to the graphic effect. The security manager 3252 may provide all security functions used for system security or user authentication. According to an embodiment, when the electronic device (for example, the electronic device 101) includes a telephone call function, the middleware 3230 may further include a telephony manager for managing a voice call function or a video call function of the electronic device.

The middleware 3230 may include a middleware module that forms combinations of various functions of the above described elements. The middleware 3230 may provide specialized modules according to types of operating systems in order to provide differentiated functions. Furthermore, the middleware 3230 may dynamically remove some of the existing elements, or may add new elements.

The API 3260 (for example, the API 145) is, for example, a set of API programming functions, and may be provided with a different configuration according to an OS. For example, in an embodiment using Android® or iOS®, one API set may be provided for each platform, and for example, in an embodiment using Tizen®, two or more API sets may be provided for each platform.

The applications 3270 (for example, the application programs 147) may include, for example, one or more applications that can perform functions, such as home 3271, dialer 3272, SMS/MMS 3273, Instant Message (IM) 3274, browser 3275, camera 3276, alarm 3277, contacts 3278, voice dial 3279, e-mail 3280, calendar 3281, media player 3282, album 3283, clock 3284, health care (for example, measure exercise quantity or blood sugar), or environment information (for example, atmospheric pressure, humidity, temperature information or the like).

According to an embodiment, the applications 3270 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and may provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 3270 may include applications (for example, a health care application of a mobile medical appliance or the like) designated according to attributes of the external electronic device 102 or 104. According to an embodiment, the application 3270 may include an application received from the external electronic device (for example, the server 106, or the electronic device 102 or 104). According to an embodiment, the applications 3270 may include a preloaded application or a third party application that can be downloaded from the server. Names of the elements of the program module 3210, according to the above-described embodiments of the present disclosure, may change depending on the type of OS.

According to various embodiments of the present disclosure, at least some of the program module 3210 may be implemented in software, firmware, hardware, or a combination of two or more thereof. At least some of the program module 3210 may be implemented (e.g., executed) by, for example, the processor (e.g., the processor 210). At least some of the program module 3210 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which are known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or the programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, in a computer-readable recording medium, which records a program performed on a computer, the program, which is executed by a processor may comprise: displaying at least one object on a screen; determining a notification display area for displaying a notification on the screen based on a gesture of a user related to at least one object displayed on the screen; and displaying the notification in at least one determined notification display area.

Although the present disclosure is described using exemplary embodiments, various changes and modifications may be suggested to one skilled in the art. It is intended that the present disclosure encompass such changes and modifications as fall within the scope of the appended claims.

What is claimed is:

1. An electronic device comprising:
   a touch-screen display; and
   at least one processor, wherein the at least one processor is configured to:
   display, via the touchscreen display, a first screen including a plurality of icons and a floating object, wherein the floating object is displayable at a position overlapping with one icon among the plurality of icons,
   receive, via the touchscreen display, a first user input with respect to the first screen while the plurality of icons and the floating object is displayed on the first screen,
   based on the first user input, display, via the touchscreen display, a second screen different from the first screen, wherein the second screen includes a virtual keypad including a plurality of objects, and wherein the floating object temporally overlaps, at a specified position, at least one object among the plurality of objects which is used for character input,
   based on the specified position corresponding to a first region of the virtual keypad, move and display, on the second screen, the floating object from the specified position to a first predetermined position closer to a first corner of the touchscreen display than the specified position after the floating object temporally overlaps the at least one object among the plurality of objects of the virtual keypad, wherein the first predetermined position includes a position not overlapping the plurality of objects of the virtual keypad, and
   based on the specified position corresponding to a second region of the virtual keypad different from the first region, move and display, on the second screen, the floating object from the specified position to a second predetermined position, closer to a second corner of the touchscreen display than the specified position after the floating object temporally overlaps the at least one object among the plurality of objects of the virtual keypad, wherein the second predetermined position includes a position not overlapping the plurality of objects of the virtual keypad.

2. The electronic device of claim 1, wherein
   a transparency of the floating object is changed after a predetermined time has elapsed.

3. The electronic device of claim 1, wherein the first predetermined position and the second predetermined position are different position each other.

4. The electronic device of claim 1, wherein the at least one processor is further configured to move the floating object from the specified position to the first predetermined position without a second user input.

5. The electronic device of claim 1, wherein the at least one processor is further configured to display at least one item based on a third user input, at the first predetermined position, with respect to the floating object.

6. The electronic device of claim 5, wherein the
   at least one item overlaps at least part of the virtual keypad.

7. A method for controlling an electronic device, the method comprising:
   displaying, via a touchscreen display of the electronic device, a first screen including a plurality of icons and a floating object wherein the floating object is displayable at a position overlapping with one icon among the plurality of icons;
   receiving, via the touchscreen display, a first user input with respect to the first screen while the plurality of icons and the floating object is displayed on the first screen;
   based on the first user input, displaying, via the touchscreen display, a second screen different from the first screen, wherein the second screen includes a virtual keypad including a plurality of objects, and wherein the floating object temporally overlaps, at a specified position, at least one object among the plurality of objects which is used for character input;
   based on the specified position corresponding to a first region of the virtual keypad, moving and displaying, on the second screen, the floating object from the specified position to a first predetermined position closer to a first corner of the touchscreen display than the specified position after the floating object temporally overlaps the at least one object among the plurality of objects of the virtual keypad, wherein the first predetermined position includes a position not overlapping the plurality of objects of the virtual keypad; and
   based on the specified position corresponding to a second region of the virtual keypad different from the first region, moving and displaying, on the second screen, the floating object from the specified position to a second predetermined position closer to a second corner of the touchscreen display than the specified position after the floating object temporally overlaps the at least one object among the plurality of objects of the virtual keypad, wherein the second predetermined position includes a position not overlapping the plurality of objects of the virtual keypad.

8. The method of claim 7,
   wherein a transparency of the floating object is changed after a predetermined time has elapsed.

9. The method of claim 7,
   wherein the first predetermined position and the second predetermined position are different position each other.

10. The method of claim 7, further comprising moving the floating object from the specified position to the first predetermined position without a second user input.

11. The method of claim 7, further comprising
    displaying at least one item based on a third user input, at the first predetermined position, with respect to the floating object.

12. The method of claim 11,
wherein the at least one item overlaps at least part of the virtual keypad.

\* \* \* \* \*